(12) United States Patent
Takahashi

(10) Patent No.: US 8,327,053 B2
(45) Date of Patent: Dec. 4, 2012

(54) BUS CONTROL SYSTEM AND SEMICONDUCTOR INTEGRATED CIRCUIT

(75) Inventor: Seigo Takahashi, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 230 days.

(21) Appl. No.: 12/785,062

(22) Filed: May 21, 2010

(65) Prior Publication Data

US 2010/0306430 A1     Dec. 2, 2010

(30) Foreign Application Priority Data

May 26, 2009  (JP) ................................ 2009-126571

(51) Int. Cl.
*G06F 13/00*     (2006.01)
*G06F 13/36*     (2006.01)

(52) U.S. Cl. ......... 710/107; 710/112; 710/306; 710/310

(58) Field of Classification Search ........... 710/305–315
See application file for complete search history.

(56) References Cited

U.S. PATENT DOCUMENTS

| | | | | | |
|---|---|---|---|---|---|
| 5,535,340 | A | * | 7/1996 | Bell et al. ...................... | 710/112 |
| 5,961,623 | A | * | 10/1999 | James et al. .................... | 710/113 |
| 7,035,958 | B2 | * | 4/2006 | Augsburg et al. ............. | 710/310 |
| 7,590,764 | B2 | * | 9/2009 | Rooney ............................. | 710/5 |
| 7,970,977 | B1 | * | 6/2011 | Li et al. ......................... | 710/310 |

FOREIGN PATENT DOCUMENTS

JP          2000-040071 A     2/2000

* cited by examiner

*Primary Examiner* — Brian Misiura
(74) *Attorney, Agent, or Firm* — Arent Fox LLP

(57) ABSTRACT

A bus control circuit includes a first bus to which a first circuit is connected, a second bus to which a second circuit is connected and a control circuit that transfers data between the first circuit and the second circuit, wherein the control circuit monitors completion of the processing of an access request that is resident in the control circuit.

15 Claims, 21 Drawing Sheets

BUS CONTROL SYSTEM AND SEMICONDUCTOR INTEGRATED CIRCUIT

CROSS-REFERENCE TO RELATED APPLICATIONS

This application is based upon and claims the benefit of priority from the prior Japanese Patent Application No. 2009-126571 filed on May 26, 2009, the entire contents of which are incorporated herein by reference.

BACKGROUND

1. Field

Aspects in accordance with present invention relate to a bus control system and a semiconductor integrated circuit (IC).

2. Description of Related Art

Buses using various protocols have been used in semiconductor ICs. In recent years, with the aim of improvement in performance, new high-performance buses have been developed. Intellectual properties (IPs) using the new buses have also been developed.

In the development of a system on a chip (SoC), old resources have been re-used in order to reduce the cost and the man power necessary for the development.

However, a bus bridge circuit (bus bridge) that performs protocol conversion is necessary to build IPs using different protocol buses as a single SoC.

When such a bus bridge circuit is used, if a series of access requests (commands) are processed using the normal method, latency is increased. Performance is also degraded because of the increased time involved in exclusively using the two buses.

Therefore, a buffer that temporarily saves data is provided in the bus bridge circuit. An access request from a master circuit is received in the bus bridge circuit, and then the master circuit side is notified of termination of the access request.

After notifying the master circuit side of termination of the access request, the bus bridge circuit converts the access request into an access request that suits a slave side and outputs the converted access request to the slave side. Such a bus bridge circuit is known.

However, when such a technique is used, a process timing mismatch may occur between the different buses.

Japanese Laid-open Patent Publication No. 2000-040071 describes a semiconductor IC with a bus control system including multiple buses in which malfunction of a circuit connected to these buses is avoided.

SUMMARY

According to an implementation in accordance with aspects of the present invention, a bus control circuit includes: a first bus to which a first circuit is connected; a second bus to which a second circuit is connected; and a control circuit that transfers data between the first circuit and the second circuit, wherein the control circuit monitors completion of processing of an access request that is resident in the control circuit.

The object and advantages in accordance with aspects of the invention will be realized and attained by means of the elements and combinations particularly pointed out in the claims.

It is to be understood that both the foregoing general description and the following detailed description are exemplary and explanatory and are not restrictive of the invention, as claimed. Additional advantages and novel features of aspects of the present invention will be set forth in part in the description that follows, and in part will become more apparent to those skilled in the art upon examination of the following or upon learning by practice thereof.

DESCRIPTION OF EMBODIMENTS

Figure 1:
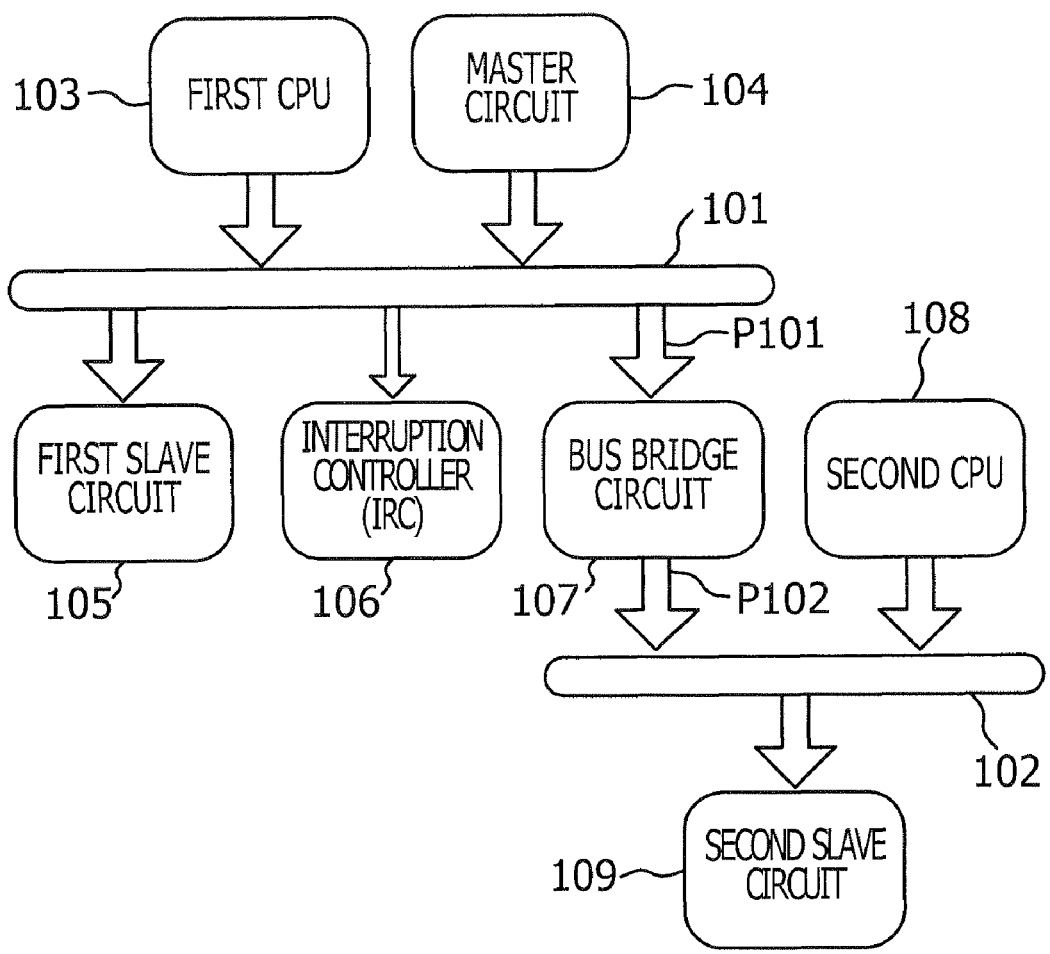
FIG. 1 is a block diagram schematically illustrating main parts of an example of a semiconductor IC to which a known bus control system is applied.

FIG. 1 is a block diagram schematically illustrating the main parts of an example of a semiconductor IC to which a known bus control system is applied.

As illustrated in FIG. 1, the known bus control system connects, for example, two different types of buses 101 and 102 via a bus bridge circuit 107.

Here, a first central processing unit (CPU) 103, a master circuit 104, a first slave circuit 105, an interruption controller (IRC) 106, and the bus bridge circuit 107 are connected to the first bus 101.

Also, the bus bridge circuit 107, a second CPU 108, and a second slave circuit 109 are connected to the second bus 102.

The bus bridge circuit 107 includes, for example, a slave port P101 that receives an access request (command) from the master circuit 104, and a master port P102 that sends a request for the second slave circuit 109.

In the bus control system as described above, when, for example, the master circuit 104 issues a writing access request for the second slave circuit 109, data to be written primarily follows a route of the master circuit 104, the bus bridge circuit 107, and the second slave circuit 109 in this order.

However, in the bus control system illustrated in FIG. 1, the bus bridge circuit 107 does not wait for a notification of reception of the data to be written from the second slave circuit 109 to notify that the writing access request has been completed before performing processing.

Thus, there may be circumstances in which, when the second CPU 108 is given a completion notification by means of interruption from the master circuit 104, a process of writing the data to the second slave circuit 109 is not completed.

Figure 2:
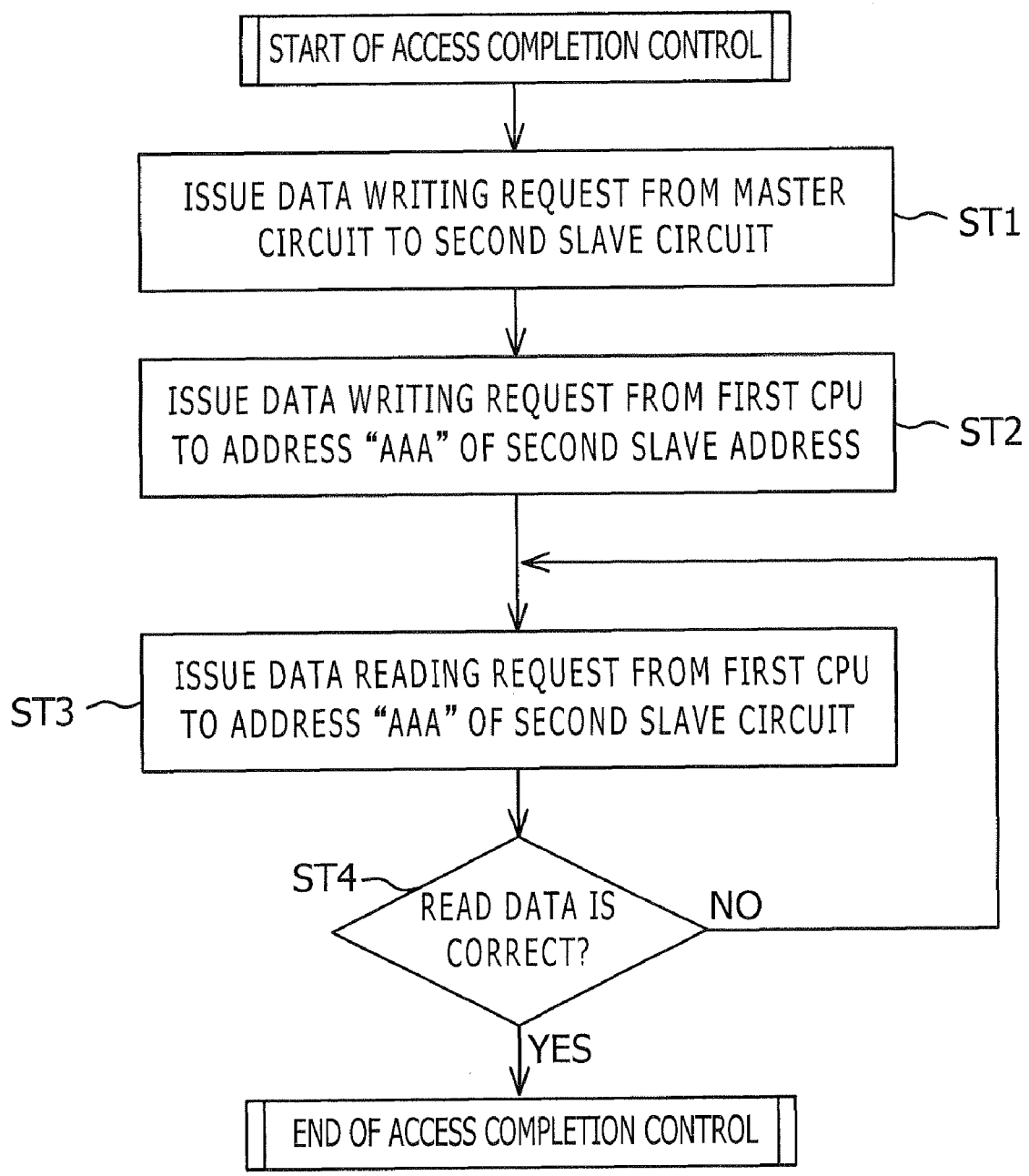
FIG. 2 is a flowchart for describing an example of a process in the known bus control system.

Therefore, a process illustrated in FIG. 2 has been proposed as a technique for avoiding this problem. That is, FIG. 2 is a flowchart for describing an exemplary process that can be implemented in the known bus control system, and illustrates an exemplary process using software that avoids the occurrence of the foregoing case.

As illustrated in FIG. 2, when access request completion control starts, access requests in steps ST1 to ST3 are issued, and processing in steps ST3 and ST4 is repeated until it is determined in step ST4 that the read data is correct.

That is, in step ST1, the master circuit 104 issues a data writing request for the second slave circuit 109. Thereafter in step ST2, the first CPU 103 issues a data writing request for the second slave circuit 109.

Further, in step ST3, the first CPU 103 issues a data reading request (at the address at which writing has been performed in step ST2) for the second slave circuit 109. Processing in steps ST3 and ST4 is repeated until it is determined in step ST4 that the read data is correct.

When it is determined in step ST4 that the read data is correct, access request completion control is terminated.

Accordingly, for example, a timing mismatch (data inconsistency) is avoided in the bus control system such as when the bus bridge circuit 107 does not wait for a notification of reception of data to be written from the second slave circuit 109 notifying that the access requests have been completed before performing the processing.

However, the foregoing known technique requires additional processing using the software, resulting in an increase in software code and degradation of operation performance.

Hereinafter, bus control systems and semiconductor ICs according to exemplary implementations in accordance with aspects of the present invention will be described in detail with reference to the attached drawings.

Figure 3:
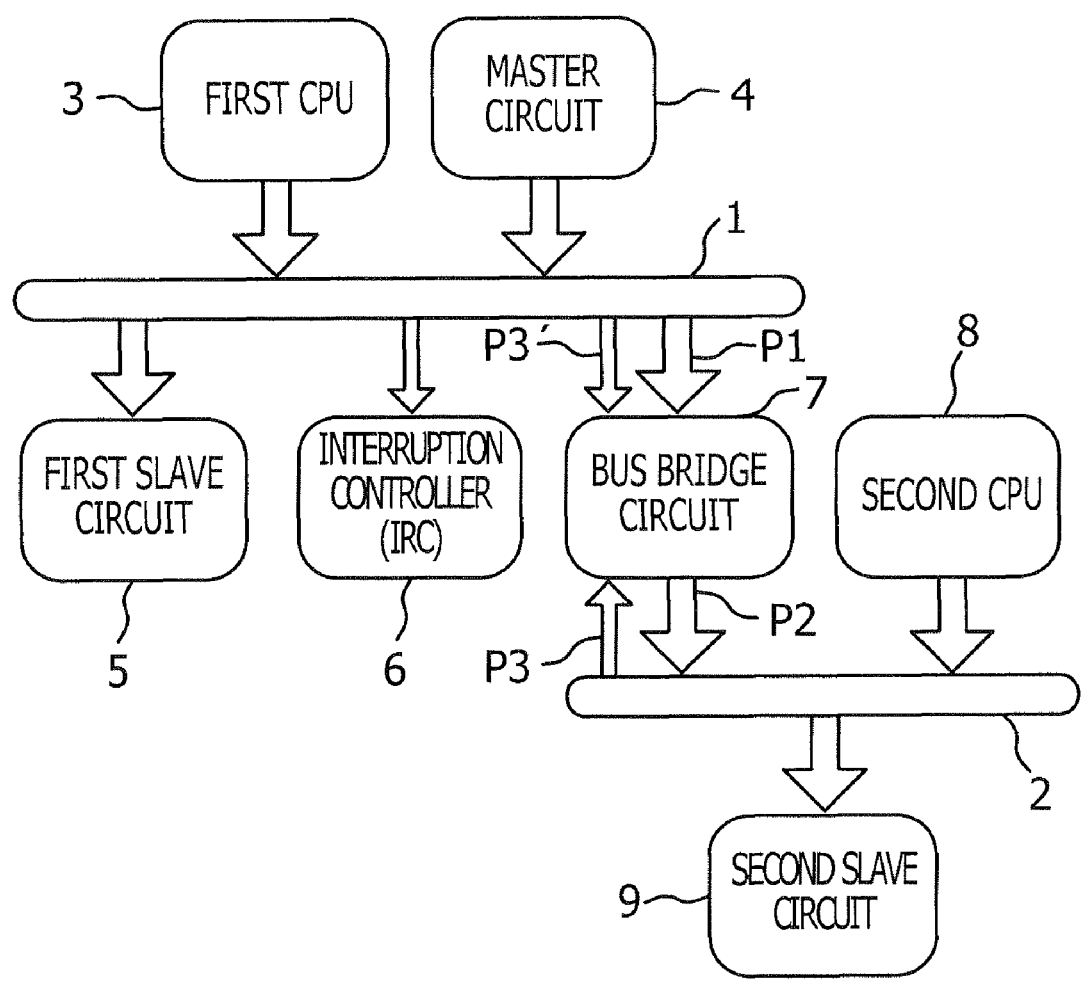
FIG. 3 is a block diagram schematically illustrating main parts of an example of a semiconductor IC to which individual embodiments are applied.

FIG. 3 is a block diagram schematically illustrating main parts of an example of a semiconductor IC to which a bus control system of each of the implementations is applied. The bus control system of each of the implementations described below is widely applicable to various semiconductor ICs.

As illustrated in FIG. 3, the bus control system of each of the implementations connects, for example, two different buses 1 and 2 (of the same type or different types) via a bus bridge circuit 7.

Here, a first CPU 3, a master circuit 4, a first slave circuit 5, an interruption controller (IRC) 6, and the bus bridge circuit 7 are connected to the first bus 1.

Also, the bus bridge circuit 7, a second CPU 8, and a second slave circuit 9 are connected to the second bus 2.

The bus bridge circuit 7 includes, for example, a slave port P1 that receives an access request from the master circuit 4, and a master port P2 that sends a request for the second slave circuit 9.

Further, the bus bridge circuit 7 includes a register slave port P3 that issues an access request for an internal control register (71). Alternatively, a register master port P3' may be provided as a port that issues an access request for the control register.

Figure 4:
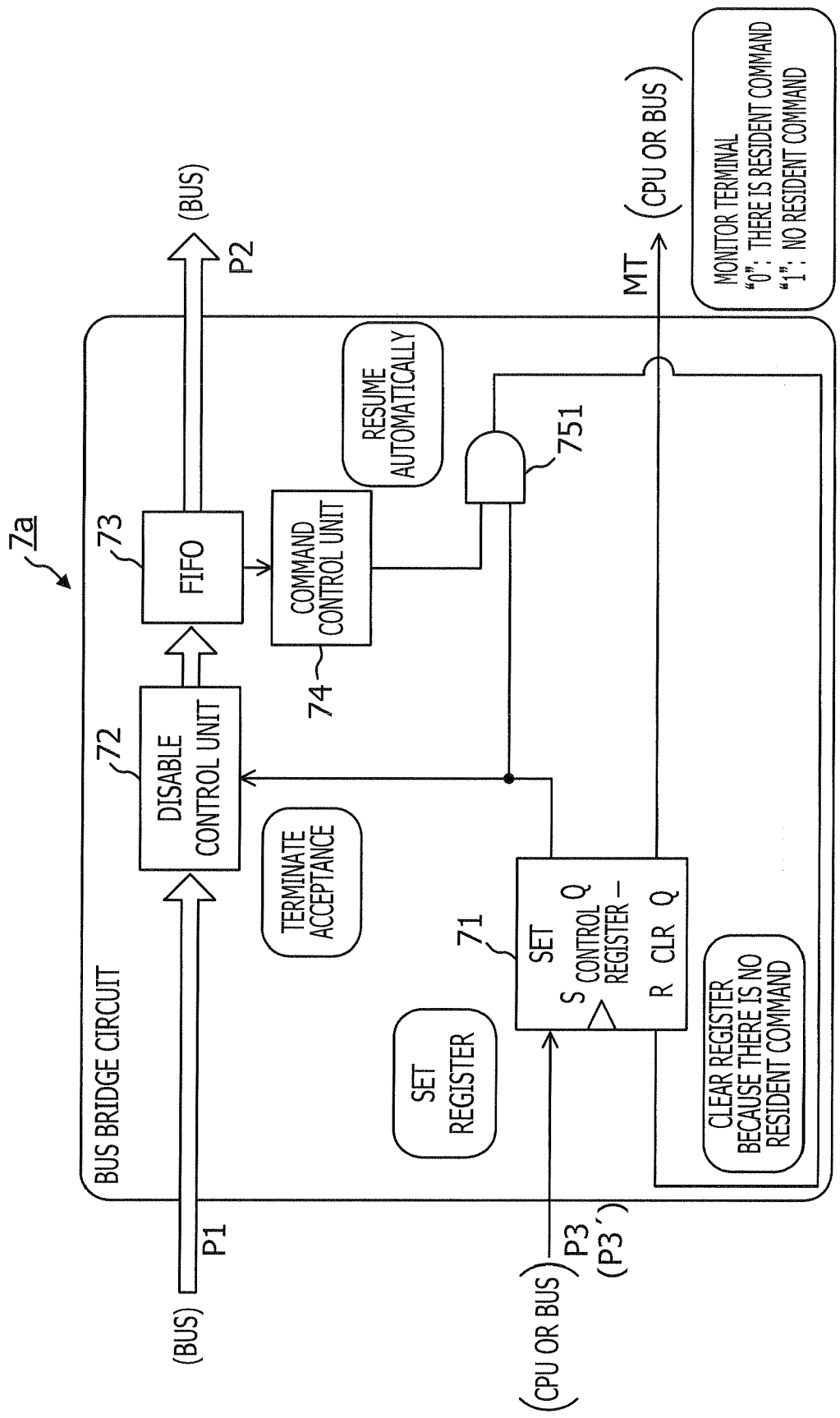
FIG. 4 is a block diagram illustrating an example of a bus bridge circuit in a bus control system of a first implementation in accordance with aspects of the present invention.
Figure 5:
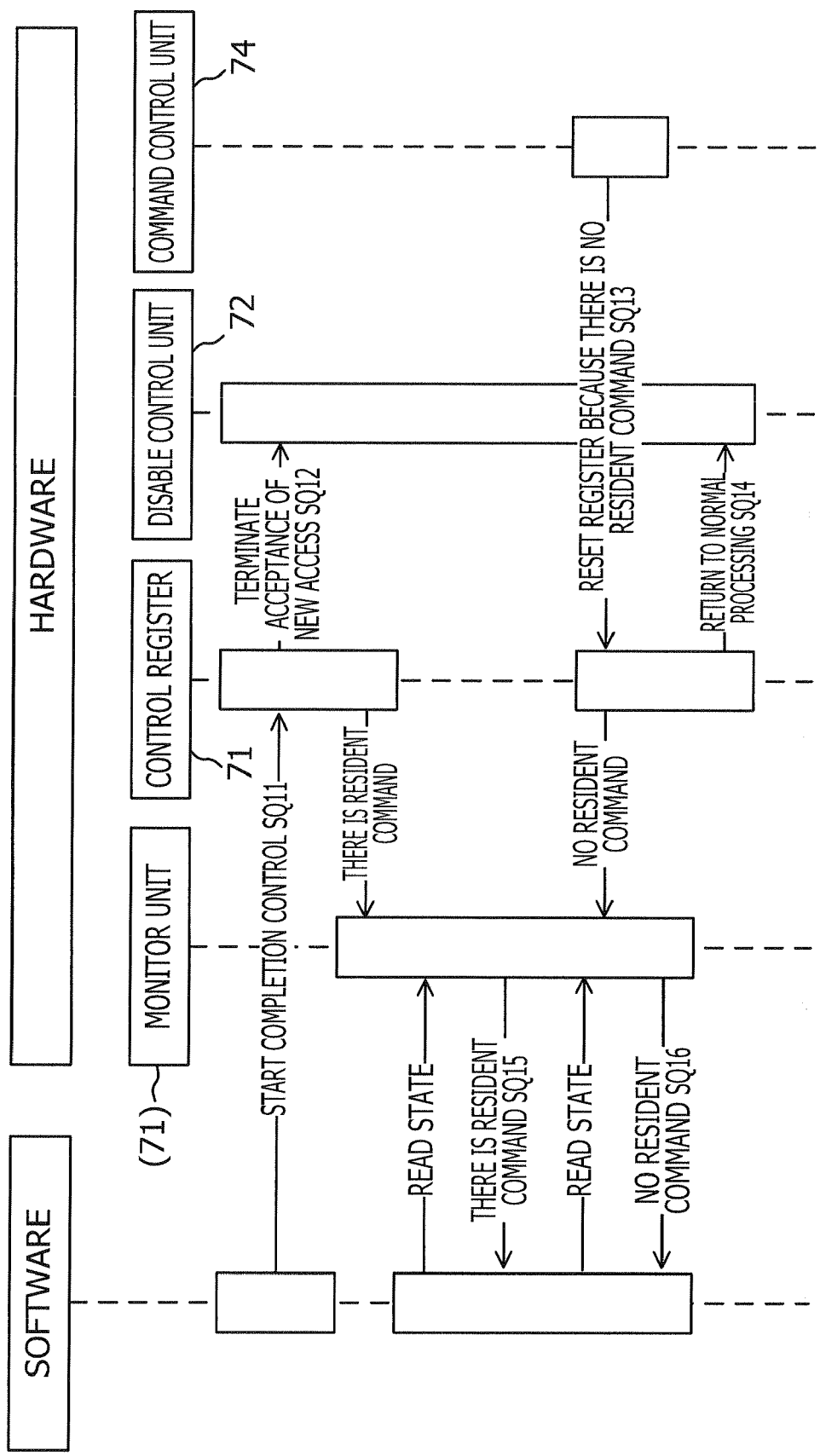
FIG. 5 is a sequence diagram for describing the bus control system of the first implementation in accordance with aspects of the present invention.

FIG. 4 is a block diagram illustrating an example of a bus bridge circuit in a bus control system of a first implementation. FIG. 5 is a sequence diagram for describing the bus control system of the first implementation.

Referring to FIG. 4, a bus bridge circuit 7a includes the control register 71, a disable control unit 72, a first-in first-out (FIFO) 73, and a command control unit 74. MT represents a monitor terminal.

The control register 71 is a register that validates an access request completion control function. The disable control unit 72 controls acceptance of processing of a new access request (command) for the bus bridge circuit 7a.

The FIFO 73 is a memory that holds an access request. The command control unit 74 monitors an access request.

Here, the control register 71 is, for example, an SR flip flop, and a control signal from a CPU or a bus is input to a set terminal S of the SR flip flop.

A signal supplied to the set terminal S of the control register 71 is input as, for example, a control signal from the first CPU 3 through the first bus 1 or a dedicated signal line.

Also, a signal supplied to the set terminal S of the control register 71 is an appropriate signal in accordance with the configuration and processing operation of the bus control system. That is, input and output units of the bus bridge circuit 7a are not limited to the ports P1 to P3 (P3') and the terminal MT illustrated in FIG. 4, and may be changed as needed.

The bus bridge circuit 7a of the first implementation includes an AND gate 751 that ANDs a Q output of the control register 71 and an output of the command control unit 74. An output of the AND gate 751 is supplied to a reset terminal R of the control register 71.

A /Q output of the control register 71 is used as an output of the monitor terminal MT indicating whether there is a resident access request. A monitor signal output from the monitor terminal MT is supplied to, for example, the second CPU 8, which requires checking whether there is a resident access request, through the second bus 2 or a dedicated signal line.

Needless to say, this monitor signal is supplied to any appropriate device in accordance with the configuration and processing operation of the bus control system.

Referring to FIG. 5, in the bus control system of the first implementation, software performs an activation setting of the control register 71 (SQ11). The disable control unit 72 terminates acceptance of a new access request for the bus bridge circuit 7a when the Q output of the control register 71 becomes "1" (SQ12).

The command control unit 74 resets (clears) the control register 71 at a timing at which processing of all access requests (commands) ends, that is, when there becomes no resident command (SQ13).

The disable control unit 72 returns to normal processing when the Q output of the control register 71 becomes "0" (SQ14). The software may check whether there is a resident command on the basis of the value of the monitor terminal MT (SQ15 and SQ16).

Here, when the value of the monitor terminal MT is "0" by way of example, it represents that there is a resident command; when the value of the monitor terminal MT is "1", it represents that there is no resident command. In FIG. 5, the control register 71 also serves as a monitor unit.

In this manner, according to the bus control system of the first implementation, a new access request is interrupted and monitored until there becomes no resident command in the bus bridge circuit 7a.

Activation of the function of interrupting and monitoring processing of a new command (access request) corresponds to an access request for the control register 71, and termination thereof corresponds to completion of processing of all access requests in the bus bridge circuit 7a.

Figure 6:
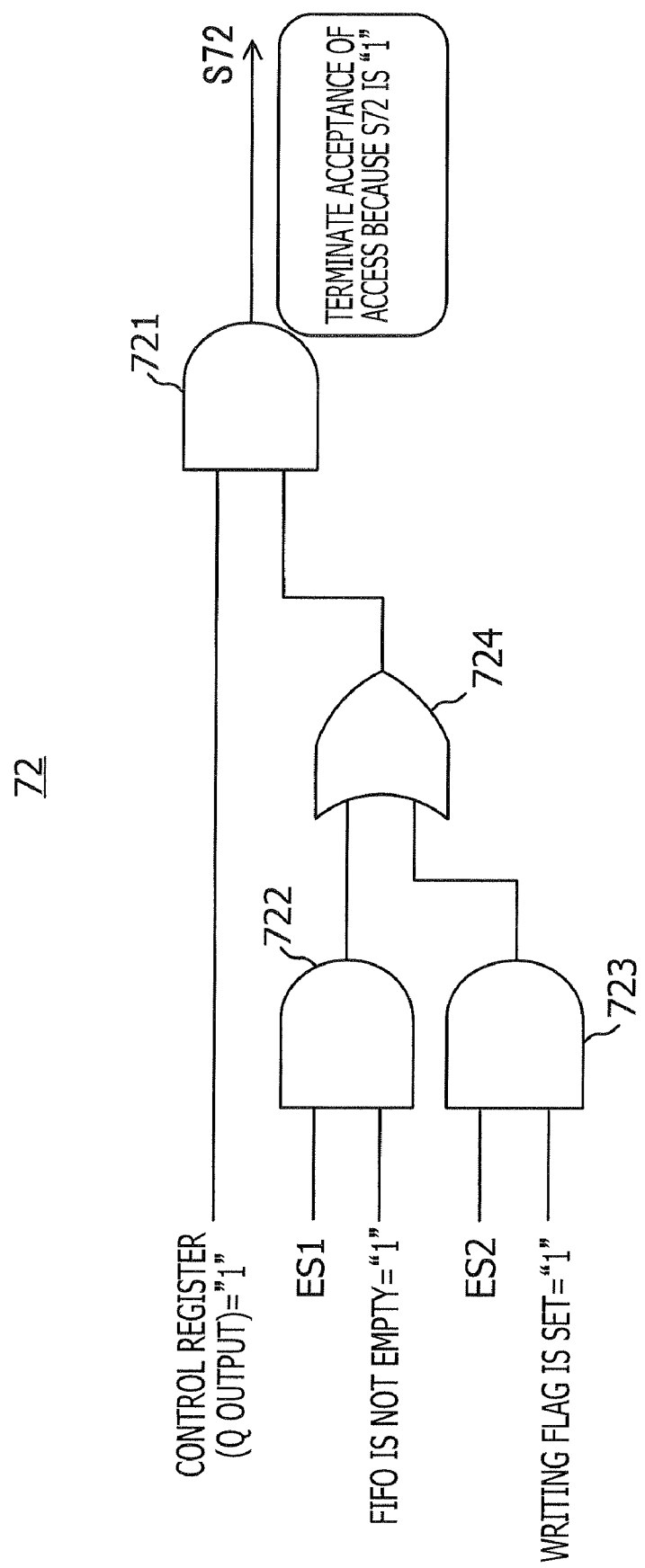
FIG. 6 is a diagram illustrating an example of a logic circuit that realizes a disable control unit in the bus bridge circuit of the first implementation in accordance with aspects of the present invention.

FIG. 6 is a diagram illustrating an example of a logic circuit that realizes the disable control unit 72 in the bus bridge circuit 7a of the first implementation.

As illustrated in FIG. 6, the disable control unit 72 includes AND gates 721 to 723 and an OR gate 724. The Q output of the control register 71 is supplied to one of two inputs of the AND gate 721.

A first enable signal (first mode signal) ES1 is supplied to one of two inputs of the AND gate 722. A state signal of the FIFO 73 is supplied to the other input of the AND gate 722. A second enable signal (second mode signal) ES2 is supplied to one of two inputs of the AND gate 723. A writing flag signal is supplied to the other input of the AND gate 723.

Here, the FIFO state signal becomes "1" when the FIFO 73 is not empty. The writing flag signal becomes "1" when there is a writing access request.

Outputs of the AND gates 722 and 723 are supplied to inputs of the OR gate 724. An output of the OR gate 724 is supplied to the other input of the AND gate 721.

When the output of the AND gate 721 is "1", acceptance of an access request is terminated. That is, the disable control unit 72 terminates acceptance of a new access request when its output S72 is "1".

Figure 7:
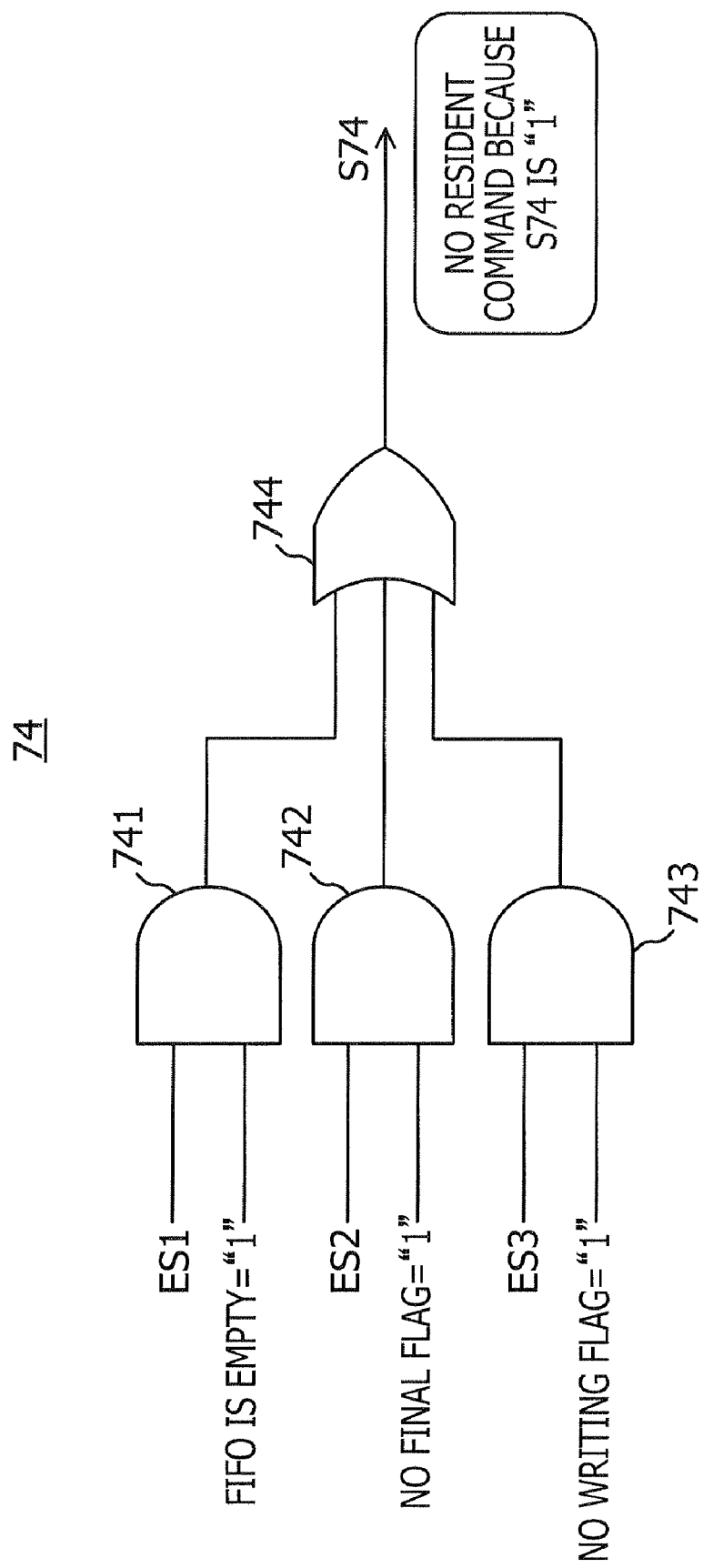
FIG. 7 is a diagram illustrating an example of a logic circuit that realizes a command control unit in the bus bridge circuit of the first implementation in accordance with aspects of the present invention.

FIG. 7 is a diagram illustrating an example of a logic circuit that realizes the command control unit 74 in the bus bridge circuit 7a of the first implementation.

As illustrated in FIG. 7, the command control unit 74 includes AND gates 741 to 743 and an OR gate 744. The first enable signal ES1 is supplied to one of two inputs of the AND gate 741, and the FIFO state signal is supplied to the other input of the AND gate 741. Here, the FIFO state signal becomes "1" when the FIFO 73 is empty.

The second enable signal ES2 is supplied to one of two inputs of the AND gate 742, and a final flag signal is supplied to the other input of the AND gate 742. A third enable signal ES3 is supplied to one of two inputs of the AND gate 743, and a writing flag signal is supplied to the other input of the AND gate 743.

Here, the final flag is a flag added to the final access request, and the final flag becomes "1" when the access request is not final. The writing flag is a flag added to a writing access request, and the writing flag becomes "1" when the access request is a writing access request.

The three enable signals ES1 to ES3 are only illustrated by way of example, and various mode signals may be used. The number of mode signals is not limited to three.

Outputs of the AND gates 741 to 743 are supplied to inputs of the OR gate 744, and an output of the OR gate 744 serves as an output S74 of the command control unit 74.

When the output of the OR gate 744 is "1", that is, when the output S74 of the command control unit 74 is "1", it is determined that there is no resident command, and the control register 71 is cleared (reset).

The logic circuits illustrated in FIGS. 6 and 7 are simply examples of logic circuits that realize the disable control unit 72 and the command control unit 74. Needless to say, various changes may be made to the logic circuits in accordance with the structure of the bus bridge circuit 7a, signals used in the bus bridge circuit 7a, the signals' logic, and the like.

In this manner, according to the bus control system of the first embodiment, a processing timing mismatch may be avoided by clearing a resident command, and processing using software such as that described with reference to FIG. 2 may be eliminated or becomes unnecessary.

Further, according to the bus control system of the first embodiment, degradation of the processing performance of the bus bridge may be kept at a minimum.

Therefore, according to the bus control system of the first implementation, by embedding access request completion control into a circuit that temporarily saves writing data, the occurrence of additional processing using software may be suppressed while the bus performance is maintained.

The foregoing advantageous effects are not limited to the first implementation, and these advantageous effects are similarly achieved in second to seventh implementations described below.

Figure 8:
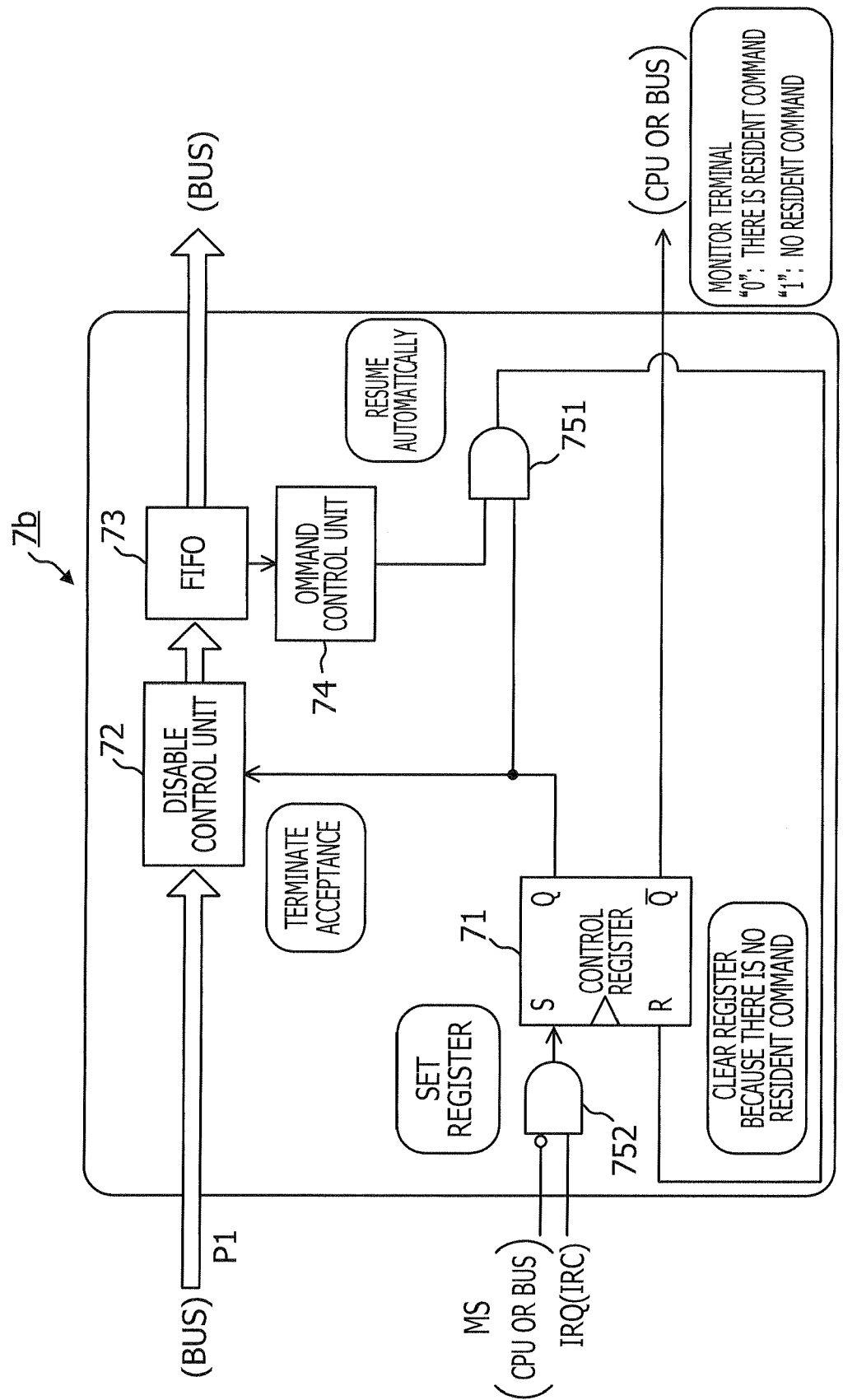
FIG. 8 is a block diagram illustrating an example of a bus bridge circuit in a bus control system of a second implementation in accordance with aspects of the present invention.
Figure 9:
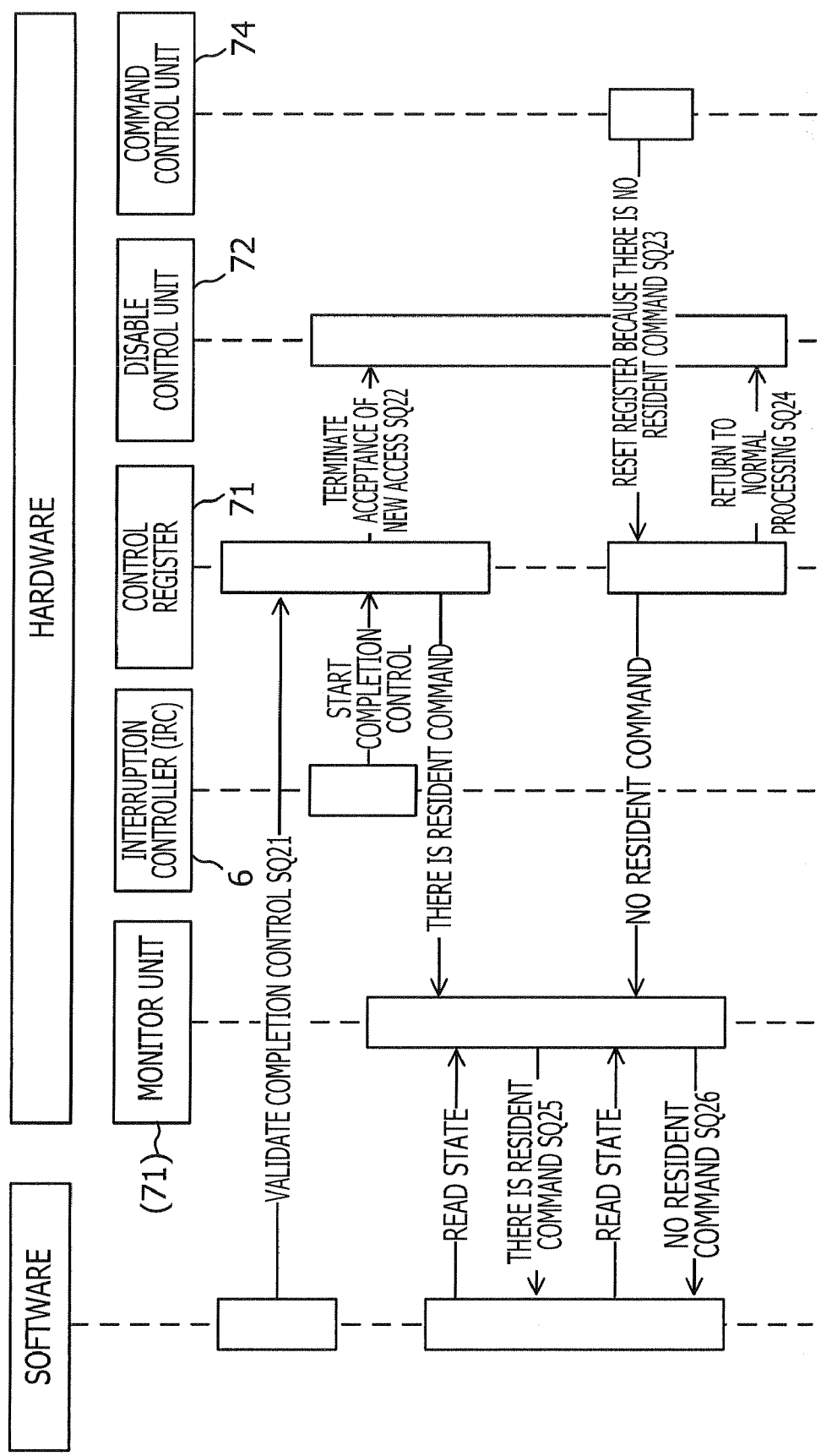
FIG. 9 is a sequence diagram for describing the bus control system of the second implementation in accordance with aspects of the present invention.

FIG. 8 is a block diagram illustrating an example of a bus bridge circuit in a bus control system of the second implementation, and FIG. 9 is a sequence diagram for describing the bus control system of the second implementation.

As is clear from comparison of FIG. 8 with FIG. 4 described above, a bus bridge circuit 7b of the second implementation obtains a signal to be supplied to the set input S of the control register 71 as a signal obtained by performing a logic operation on a mask signal MS and an interruption signal IRQ from the IRC 6.

That is, in the bus bridge circuit 7b of the second implementation, the mask signal MS is logic-inverted and supplied to one of two inputs of an AND gate 752, and the interruption signal IRQ is supplied to the other input of the AND gate 752.

An output of the AND gate 752 is supplied to the set input S of the control register 71.

The remaining structure is the same as or similar to that of the bus bridge circuit 7a of the first embodiment described with reference to FIG. 4, and a description thereof is omitted.

Referring to FIG. 9, in the bus control system of the second implementation, when the mask signal MS is inactive ("0") and the interruption signal IRQ becomes effective ("1"), the control register 71 is activated (SQ21).

When the Q output of the control register 71 becomes "1", the disable control unit 72 terminates acceptance of a new access request for the bus bridge circuit 7b (SQ22).

The command control unit 74 resets the control register 71 at a timing at which processing of all commands ends, that is, when there becomes no resident command (SQ23).

The disable control unit 72 returns to normal processing when the Q output of the control register 71 becomes "0" (SQ24). The software may check whether there is a resident command on the basis of the value of the monitor terminal MT (SQ25 and SQ26).

In this manner, according to the bus control system of the second implementation, a new access request is interrupted and monitored until there becomes no resident command in the bus bridge circuit 7b.

Activation of this function corresponds to interruption (IRQ), and termination thereof corresponds to completion of processing of all commands in the bus bridge circuit 7b.

When the interruption signal (IRQ) is a level signal or an L-active (low-active) pulse signal, it is necessary to convert the signal into an H-active (high-active) pulse signal and then input the converted signal.

Figure 10:
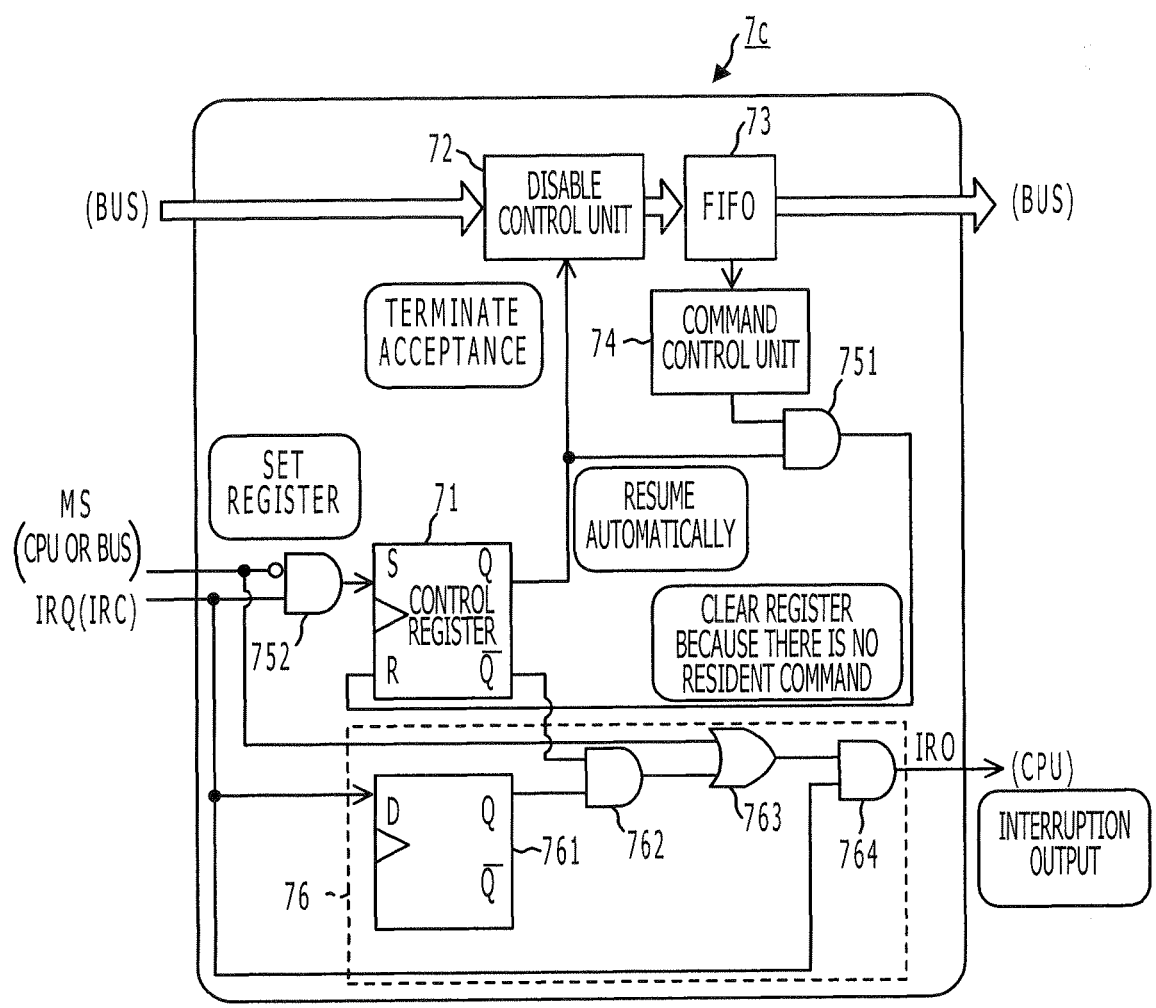
FIG. 10 is a block diagram illustrating an example of a bus bridge circuit in a bus control system of a third implementation in accordance with aspects of the present invention.
Figure 11:
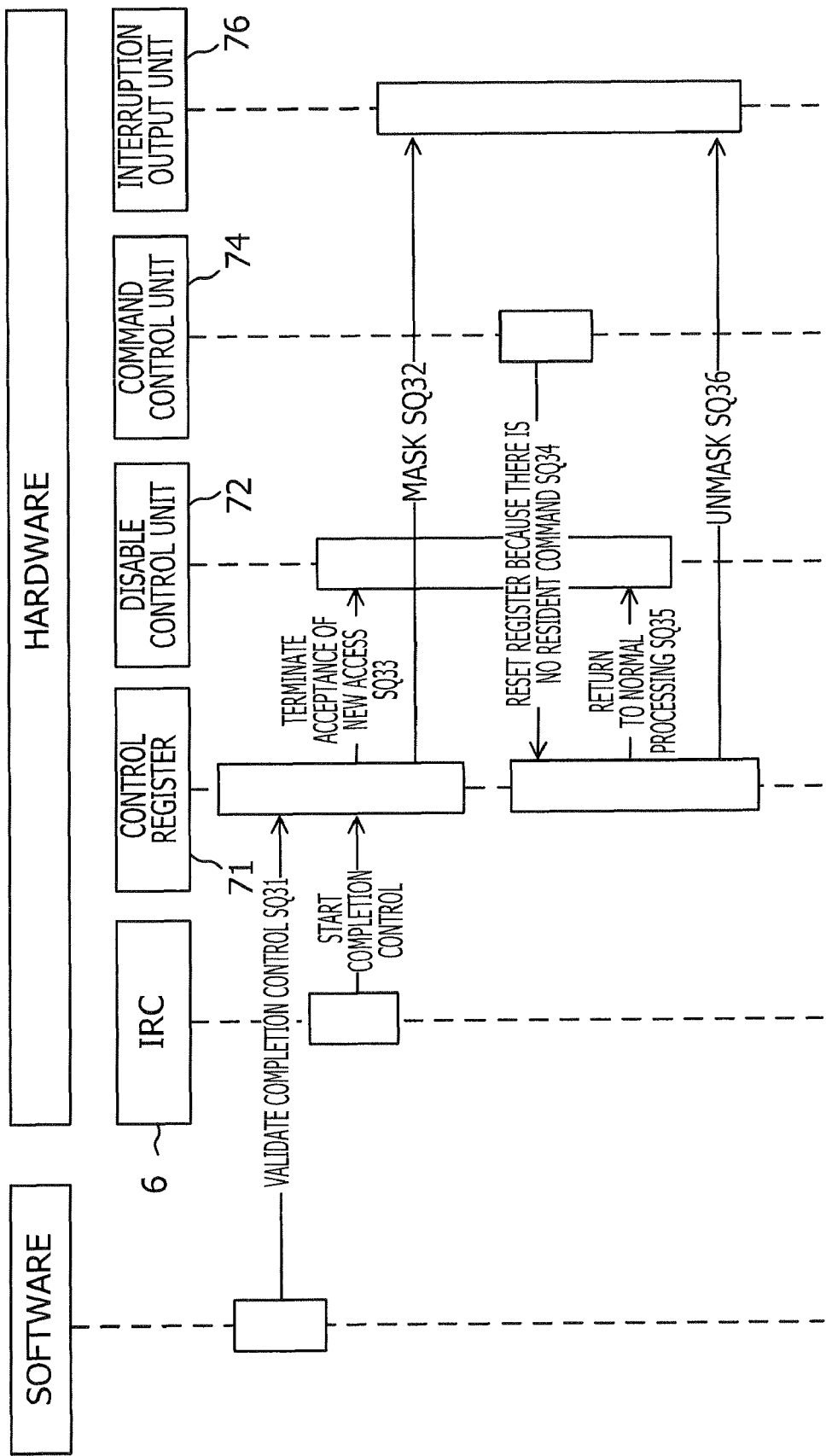
FIG. 11 is a sequence diagram for describing the bus control system of the third implementation in accordance with aspects of the present invention.

FIG. 10 is a block diagram illustrating an example of a bus bridge circuit in a bus control system of the third implementation, and FIG. 11 is a sequence diagram for describing the bus control system of the third implementation.

As is clear from comparison of FIG. 10 with FIG. 8 described above, a bus bridge circuit 7c of the third implementation corresponds to a circuit obtained by adding an interruption output unit 76 to the bus bridge circuit 7b of the second implementation.

The interruption output unit 76 includes a flip flop 761, AND gates 762 and 764, and an OR gate 763.

The interruption signal IRQ from the IRC 6 is input to a data input D of the flip flop 761. A Q output of the flip flop 761 is supplied to one of two inputs of the AND gate 762. The inverted output /Q of the control register 71 is supplied to the other input of the AND gate 762.

An output of the AND gate 762 is supplied to one of two inputs of the OR gate 763, and the mask signal MS is supplied to the other input of the OR gate 763. An output of the OR gate 763 is supplied to one of two inputs of the AND gate 764.

The interruption signal IRQ is input to the other input of the AND gate 764. An output of the AND gate 764 is output as an interruption output IRO from the bus bridge circuit 7c.

That is, in the bus bridge circuit 7c of the third implementation, the control register 71 is activated when the interruption signal IRQ becomes effective ("1"). At the same time, the interruption output IRO is output, thereby masking the interruption signal IRQ to the CPU.

Here, for example, when the interruption signal IRQ is supplied from the IRC 6 to the second CPU 8 illustrated in FIG. 3, the interruption signal IRQ is replaced by the interruption output IRO from the bus bridge circuit 7c of the third implementation, and the interruption output IRO is supplied to the second CPU 8.

Instead of being provided in the bus bridge circuit 7c, the interruption output unit 76 may be provided outside the bus bridge circuit 7c, such as in the IRC 6, by extracting a necessary signal (e.g., the /Q output of the control register 71) to the outside.

Referring to FIG. 11, in the bus control system of the third implementation, when the mask signal MS is inactive ("0") and the interruption signal IRQ becomes effective ("1"), the control register 71 is activated (SQ31).

At the same time as the activation of the control register 71, the interruption signal (IRO) to the CPU becomes masked (SQ32).

When the Q output of the control register 71 becomes "1", the disable control unit 72 terminates acceptance of a new access request for the bus bridge circuit 7c (SQ33).

The command control unit 74 resets the control register 71 at a timing at which processing of all commands ends, that is, when there becomes no resident command (SQ34).

The disable control unit 72 returns to normal processing when the Q output of the control register 71 becomes "0" (SQ35). When the /Q output of the control register 71 becomes "0", the masked interruption signal (IRO) to the CPU becomes unmasked (SQ36).

In this manner, according to the bus control system of the third implementation, a new access request is interrupted and monitored until there becomes no resident command in the bus bridge circuit 7c. Activation of the function of interrupting and monitoring a new access request corresponds to interruption, and termination thereof corresponds to completion of processing of all commands in the bus bridge circuit 7c.

When the interruption signal (IRQ) is an L-active (low-active) level signal, it is necessary to convert the signal into an H-active (high-active) level signal and then input the converted signal. When the interruption signal (IRQ) is a pulse signal, it is necessary to convert the signal into an H-active (high-active) level signal and then input the converted signal. At the same time, after interruption processing ends, it is necessary to reset the converted interruption signal. A scheme that performs such processing is necessary.

Figure 12:
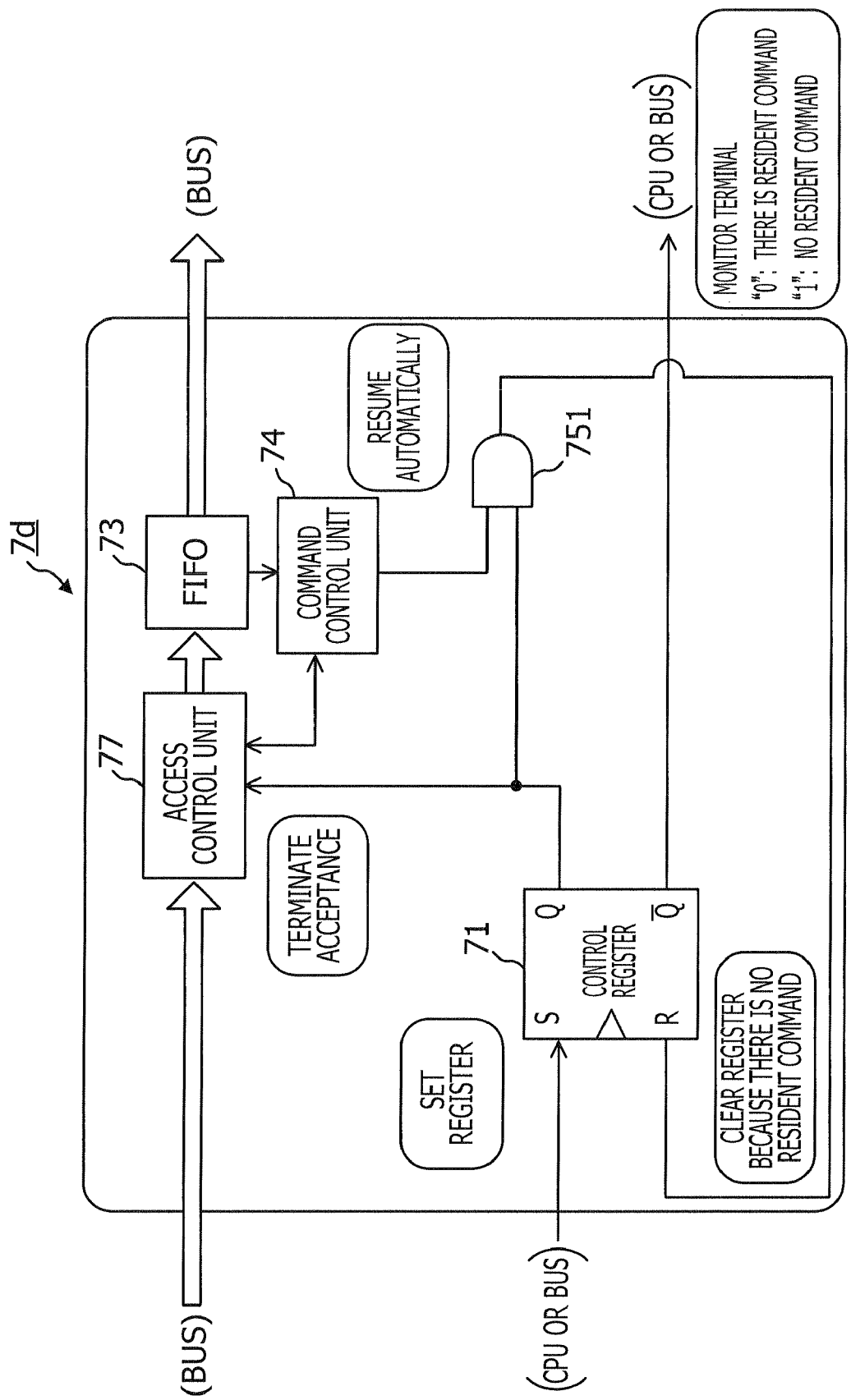
FIG. 12 is a block diagram illustrating an example of a bus bridge circuit in a bus control system of a fourth implementation in accordance with aspects of the present invention.
Figure 13:
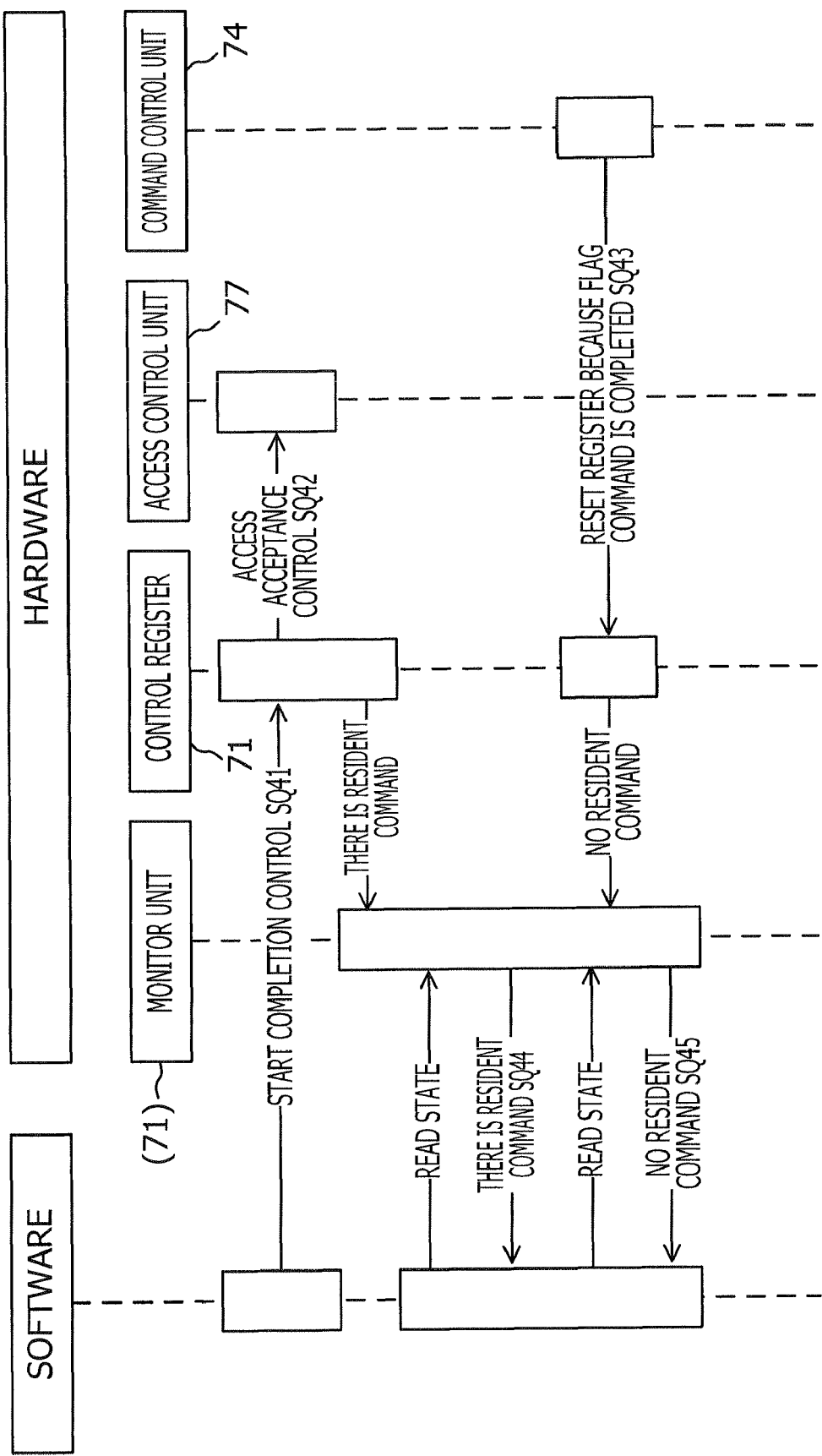
FIG. 13 is a sequence diagram for describing the bus control system of the fourth implementation in accordance with aspects of the present invention.

FIG. 12 is a block diagram illustrating an example of a bus bridge circuit in a bus control system of the fourth implementation, and FIG. 13 is a sequence diagram for describing the bus control system of the fourth implementation.

As is clear from comparison of FIG. 12 with FIG. 4 described above, a bus bridge circuit 7d of the fourth implementation corresponds to a circuit obtained by providing an access control unit 77 instead of the disable control unit 72 in the bus bridge circuit 7a of the first embodiment. Here, the access control unit 77 directly exchanges signals with the command control unit 74.

The control register 71 is a register that validates an access request completion control function. The FIFO 73 is a memory that holds an access request. The command control unit 74 monitors an access request.

By exchanging signals with the command control unit 74, the access control unit 77 adds a flag to an input command, and outputs the command with the flag to the FIFO 73. Since the remaining structure is the same as or similar to that of the first implementation described above, a description thereof is omitted.

Referring to FIG. 13, in the bus control system of the fourth implementation, the software performs an activation setting of the control register 71 (SQ41). At the same time as the Q output of the control register 71 becomes "1", the access control unit 77 adds a flag to a command being processed and controls acceptance of an access request (SQ42).

The command control unit 74 resets the control register 71 at a timing at which processing of the command with the flag ends, that is, when the command with the flag is completed (SQ43).

The software may check whether there is a resident command on the basis of the value of the monitor terminal MT (SQ44 and SQ45).

In this manner, according to the bus control system of the fourth implementation, a flag is set to an access request that is being accepted when the control register 71 is set or to an access request that is accepted at last, and completion of processing of that command (access request) is monitored.

Figure 14:
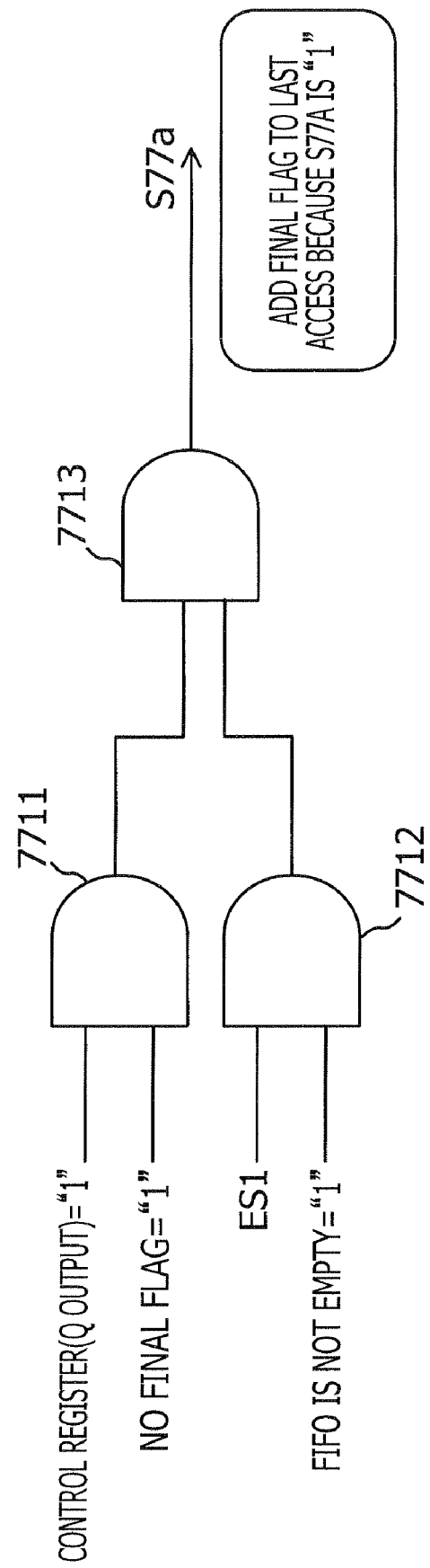
FIG. 14 is a diagram (part 1) illustrating an example of a logic circuit that realizes an access control unit in the bus bridge circuit of the fourth implementation in accordance with aspects of the present invention.
Figure 15:
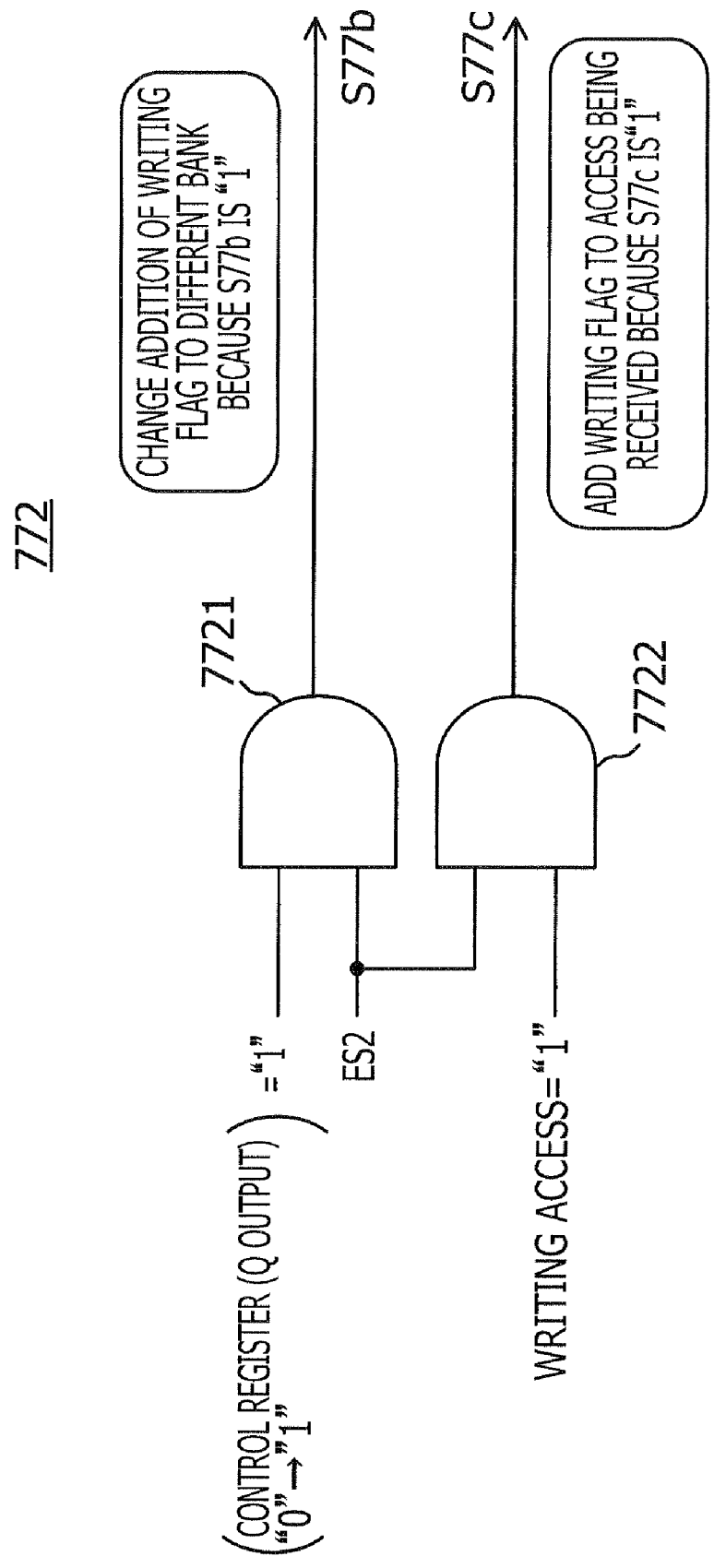
FIG. 15 is a diagram (part 2) illustrating an example of a logic circuit that realizes the access control unit in the bus bridge circuit of the fourth implementation in accordance with aspects of the present invention.

FIGS. 14 and 15 are diagrams illustrating examples of logic circuits that realize the access control unit 77 in the bus bridge circuit 7d of the fourth implementation.

As illustrated in FIGS. 14 and 15, the access control unit 77 includes two logic circuit sections 771 and 772, and outputs three signals S77a, S77b, and S77c.

As illustrated in FIG. 14, the logic circuit section 771 includes three AND gates 7711 to 7713. The Q output of the control register 71 is supplied to one of two inputs of the AND gate 7711, and a final flag signal is supplied to the other input of the AND gate 7711.

The first enable signal ES1 is supplied to one of two inputs of the AND gate 7712, and the state signal of the FIFO 73 is supplied to the other input of the AND gate 7712. The AND gate 7713 ANDs the outputs of the AND gates 7711 and 7712 and outputs the signal S77a.

The final flag signal supplied to the AND gate 7711 becomes "1" when no final flag has been added (when the access request is not an access request that is accepted at last). The FIFO state signal becomes "1" when the FIFO 73 is not empty.

When the signal S77a is "1", the access control unit 77 adds a final flag to the access request.

As illustrated in FIG. 15, the logic circuit section 772 includes two AND gates 7721 and 7722. The Q output of the control register 71 is supplied to one of two inputs of the AND gate 7721, and the second enable signal ES2 is supplied to the other input of the AND gate 7721.

That is, when the second enable signal ES2 is "1", the AND gate 7721 changes its output (signal S77b) to "1" in accordance with a change of the Q output of the control register 71 from "0" to "1".

The second enable signal ES2 is supplied to one of two inputs of the AND gate 7722, and a signal that becomes "1" in the case of a writing access request is supplied to the other input of the AND gate 7722. The output of the AND gate 7721 serves as the signal S77b. An output of the AND gate 7722 serves as the signal S77c and is output from the access control unit 77.

When the signal S77b is "1", the access control unit 77 changes addition of a writing flag to a different bank. When the signal S77c is "1", the access control unit 77 adds a writing flag to an access request being received.

The logic circuits illustrated in FIGS. 14 and 15 are simply examples of logic circuits that realize the access control unit 77. Needless to say, various changes may be made to the logic circuits in accordance with the structure of the bus bridge circuit 7d, signals used in the bus bridge circuit 7d, the signals' logic, and the like.

Figure 16:
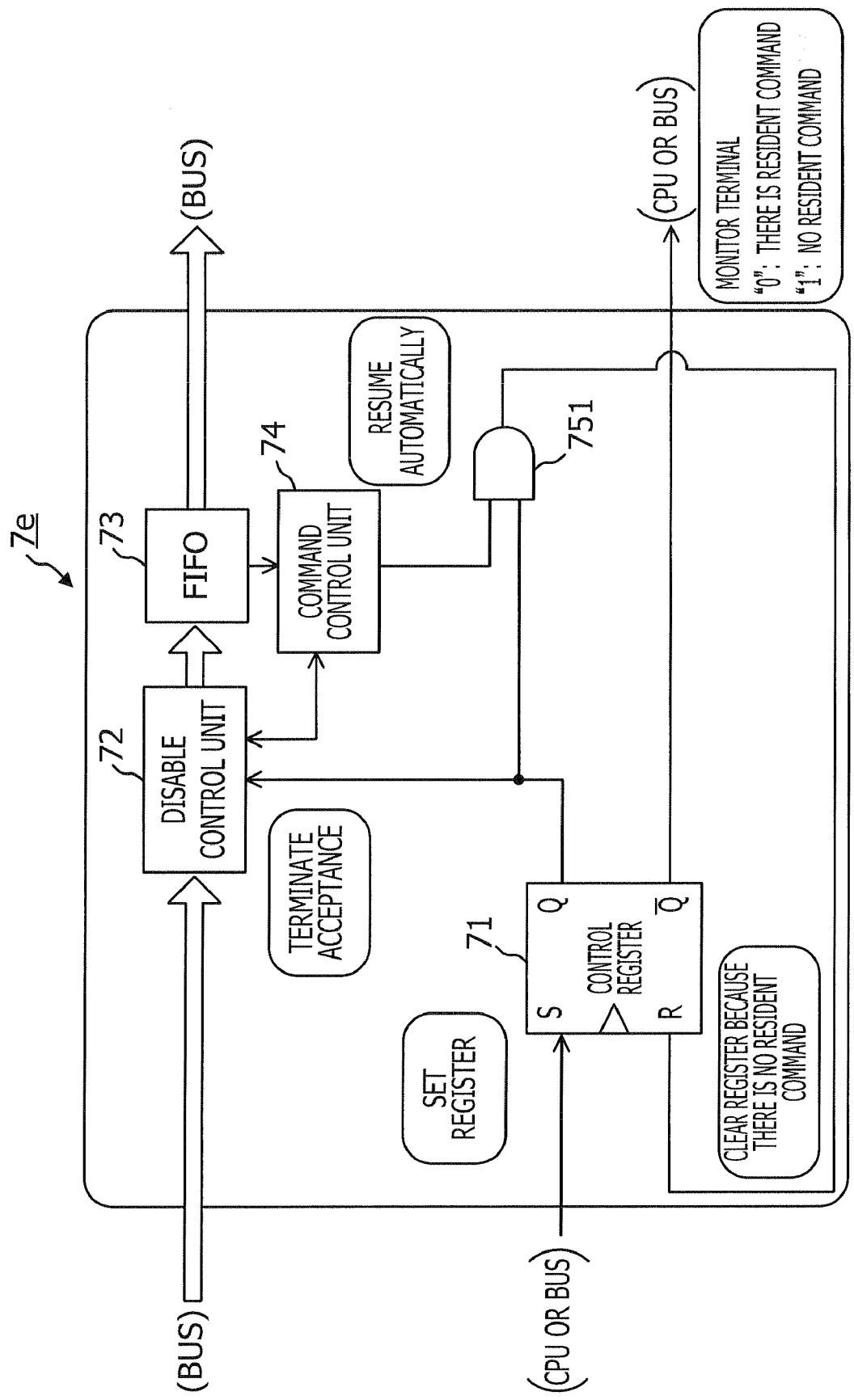
FIG. 16 is a block diagram illustrating an example of a bus bridge circuit in a bus control system of a fifth implementation in accordance with aspects of the present invention.
Figure 17:
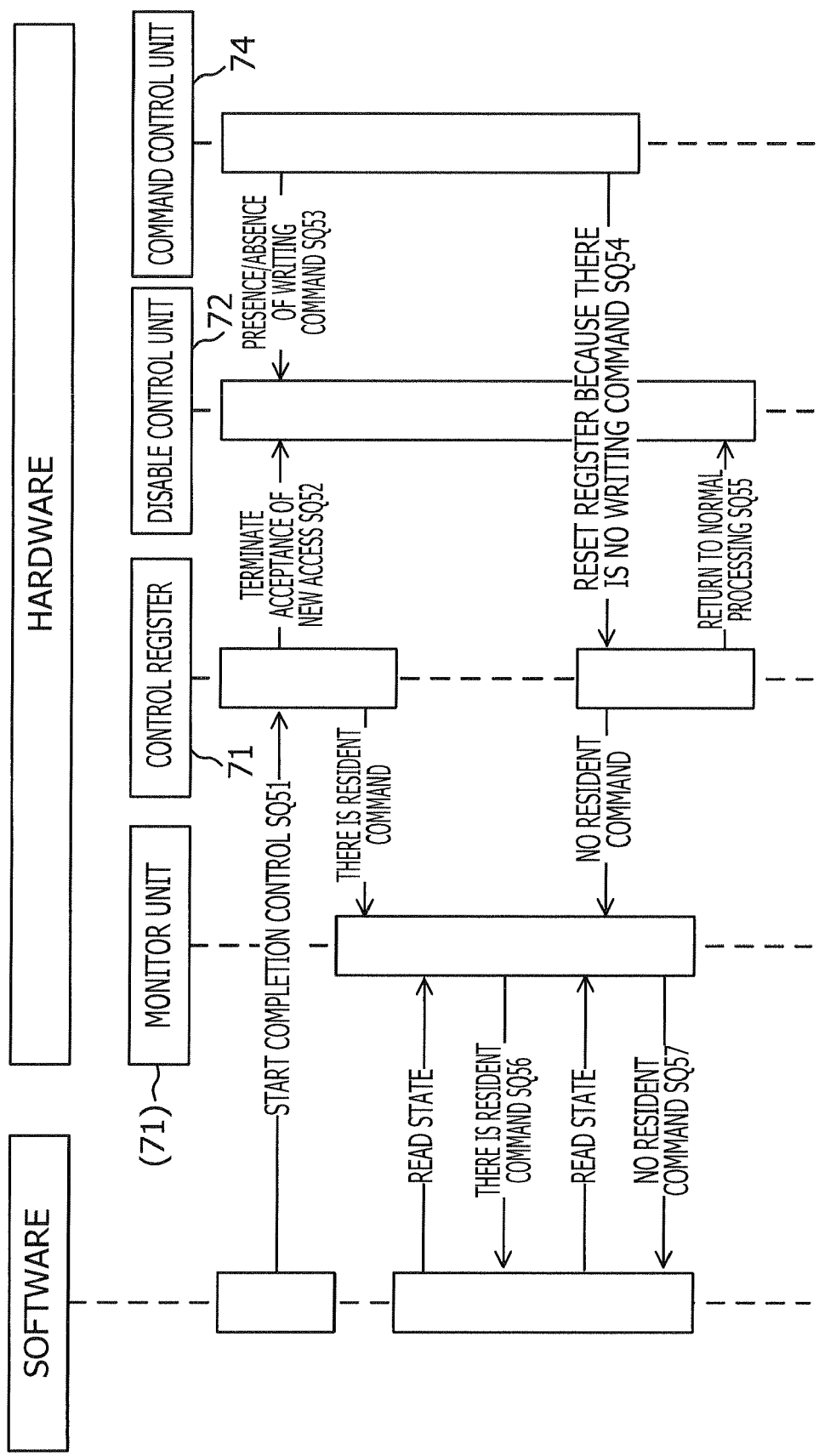
FIG. 17 is a sequence diagram for describing the bus control system of the fifth implementation in accordance with aspects of the present invention.

FIG. 16 is a block diagram illustrating an example of a bus bridge circuit in a bus control system of the fifth implementation, and FIG. 17 is a sequence diagram for describing the bus control system of the fifth implementation.

The bus control system of the fifth implementation only processes a resident command that is a writing access request. FIGS. 16 and 17 are rendered in accordance with the bus control system of the first implementation described with reference to FIGS. 4 and 5.

As is clear from comparison of FIG. 16 with FIG. 4 described above, in a bus bridge circuit 7e of the fifth implementation, the disable control unit 72 and the command control unit 74 are connected by a signal line in order to perform control using a writing command.

In the bus control system of the fifth implementation, instead of monitoring all access requests as in the case of the command control unit 74 in the bus control system of the first implementation, the command control unit 74 of the fifth implementation only monitors a writing access request. The remaining structure is the same as or similar to that of the bus bridge circuit 7a of the first implementation described with reference to FIG. 4, and a description thereof is omitted.

Referring to FIG. 17, in the bus control system of the fifth implementation, the software performs an activation setting of the control register 71 (SQ51).

When the Q output of the control register 71 becomes "1", if there is a writing access request in the bus bridge circuit 7f, the disable control unit 72 terminates acceptance of a new access request (SQ52).

That is, termination of accepting a new access request using the disable control unit 72 is performed upon receipt of a notification (SQ53) from the command control unit 74 to the disable control unit 72 indicating that there is a writing access request.

The command control unit 74 resets the control register 71 at a timing at which processing of all writing commands ends, that is, when there becomes no writing command (SQ54).

Alternatively, the command control unit 74 may reset the control register 71 at a timing at which, after processing of all writing commands ends, processing of other commands that have already been accepted ends.

The disable control unit 72 returns to normal processing when the Q output of the control register 71 becomes "0" (SQ55). The software may check whether there is a resident command on the basis of the value of the monitor terminal MT (SQ56 and SQ57).

Figure 18:
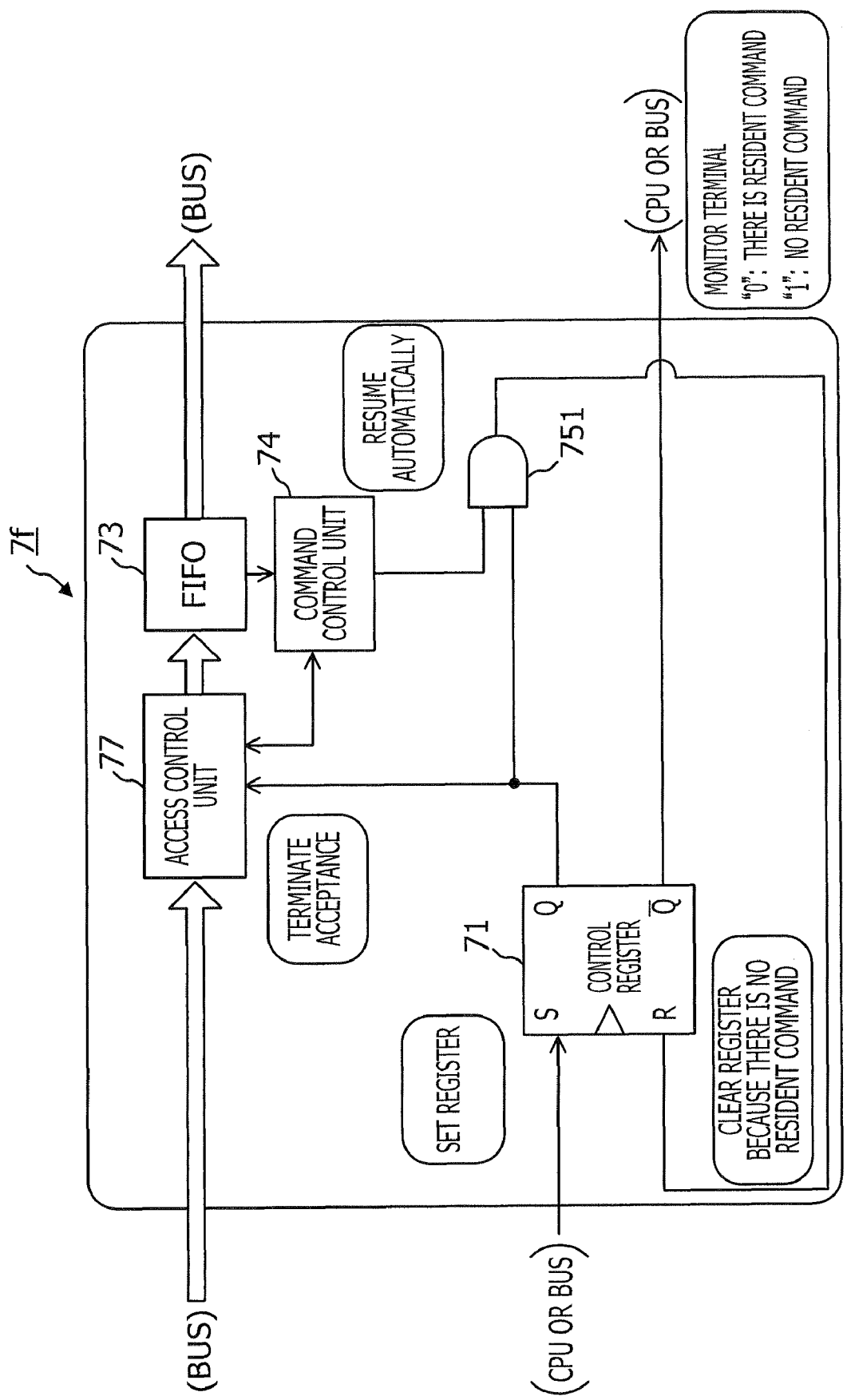
FIG. 18 is a block diagram illustrating an example of a bus bridge circuit in a bus control system of a sixth implementation in accordance with aspects of the present invention.
Figure 19:
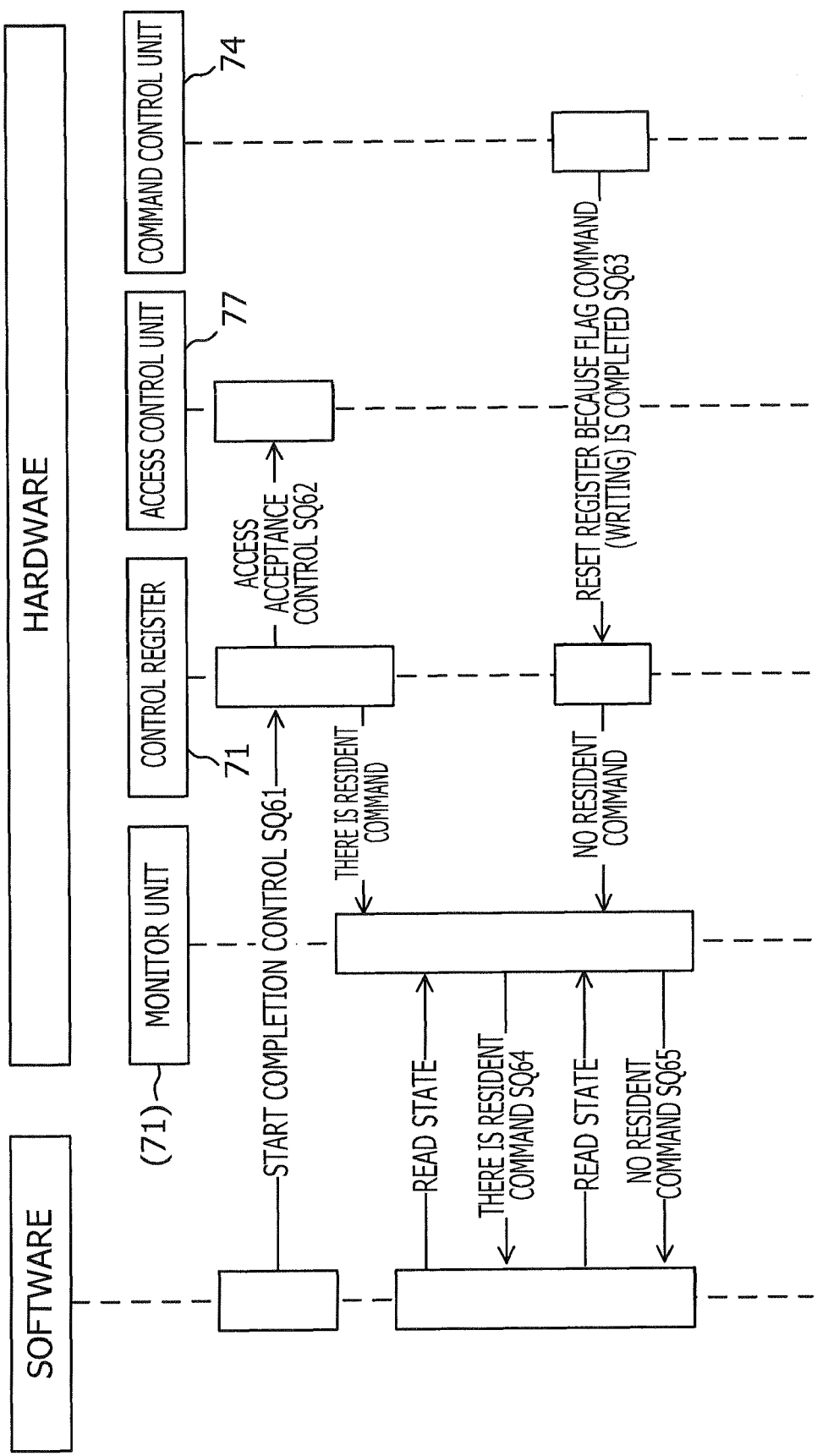
FIG. 19 is a sequence diagram for describing the bus control system of the sixth implementation in accordance with aspects of the present invention.

FIG. 18 is a block diagram illustrating an example of a bus bridge circuit in a bus control system of the sixth implementation, and FIG. 19 is a sequence diagram for describing the bus control system of the sixth implementation.

As in the fifth implementation described above, the bus control system of the sixth implementation only processes a resident command that is a writing access request. FIGS. 18 and 19 are rendered in accordance with the bus control system of the fourth implementation described with reference to FIGS. 12 and 13.

Although FIG. 18 is rendered in a manner similar to FIG. 12, the signal line connecting the command control unit 74 and the access control unit 77 also functions to reset the control register 71 when there becomes no writing command in the bus bridge circuit 7f.

In the bus control system of the sixth implementation, instead of monitoring all access requests as in the case of the command control unit 74 in the bus control system of the fourth implementation, the command control unit 74 of the sixth implementation only monitors a writing access request. The remaining structure is the same as or similar to that of the bus bridge circuit 7d of the fourth implementation described with reference to FIG. 12, and a description thereof is omitted.

Referring to FIG. 19, in the bus control system of the sixth implementation, the software performs an activation setting of the control register 71 (SQ61). When the Q output of the control register 71 becomes "1", the access control unit 77 adds a flag to a writing command being processed and controls acceptance of an access request (SQ62).

The command control unit 74 resets the control register 71 at a timing at which processing of the writing command with the flag ends, that is, when the writing command with the flag is completed (SQ63).

The software may check whether there is a resident command on the basis of the value of the monitor terminal MT (SQ64 and SQ65).

In this manner, according to the bus control system of the sixth implementation, a flag is set to a writing access request that is being accepted when the control register 71 is set or to a writing access request that is accepted at last, and completion of processing of that writing command is monitored.

In the bus control systems of the fifth and sixth implementation described above, a writing command is regarded as a processing target since a mismatch due to operation timing is generally caused by a writing command.

When, as in the sixth implementation, a flag is added to a writing command and the control register 71 is reset upon completion of the writing command with the flag, the bus bridge circuit 7f has circuit dimensions somewhat greater than those of the bus bridge circuit 7d of the fifth implementation.

When the control register 71 is immediately reset upon completion of the writing command with the flag as in the sixth implementation, the sixth implementation is advantageous in operation speed compared with the fifth implementation.

Figure 20:
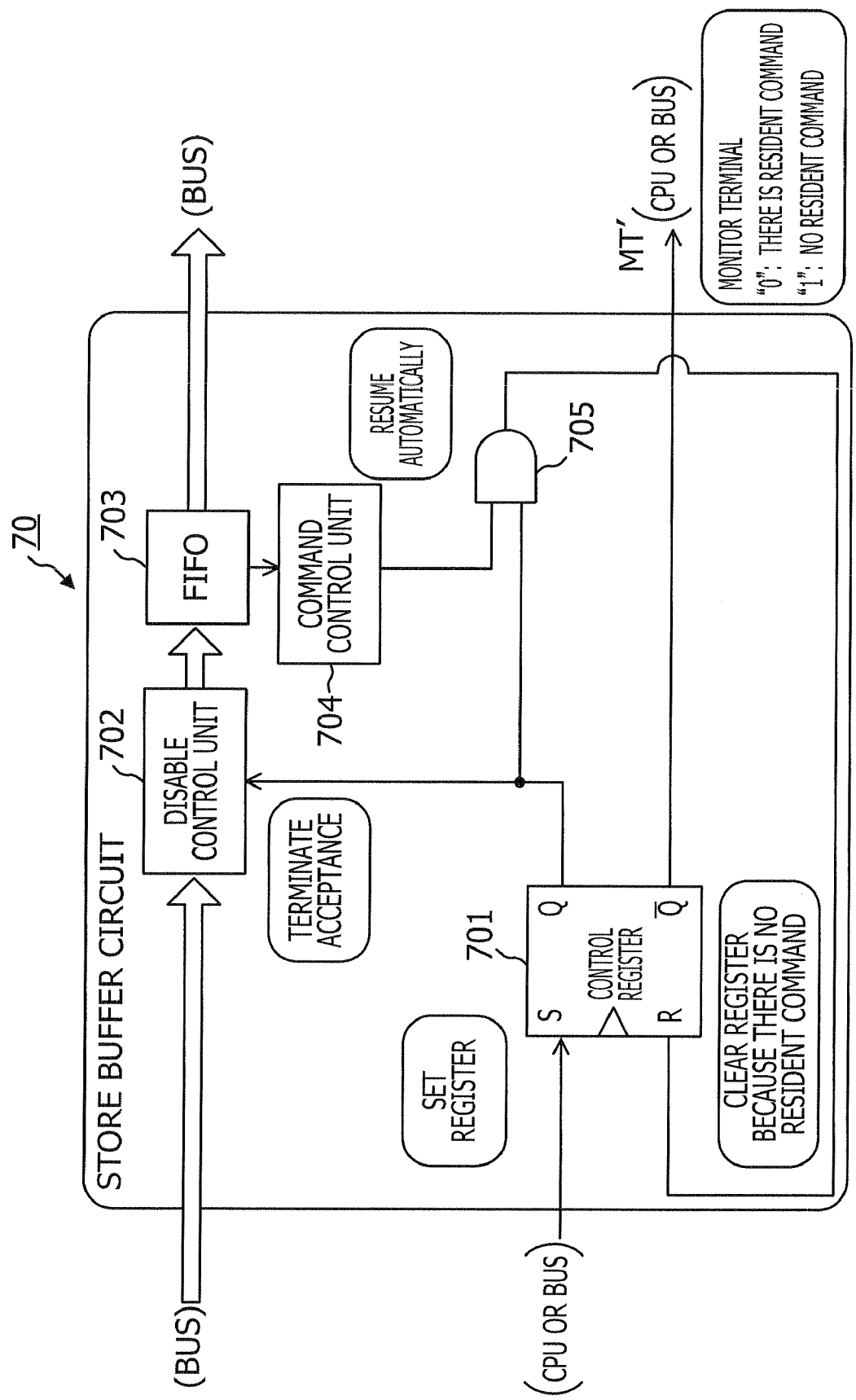
FIG. 20 is a block diagram illustrating an example of a store buffer circuit in a bus control system of a seventh implementation in accordance with aspects of the present invention.
Figure 21:
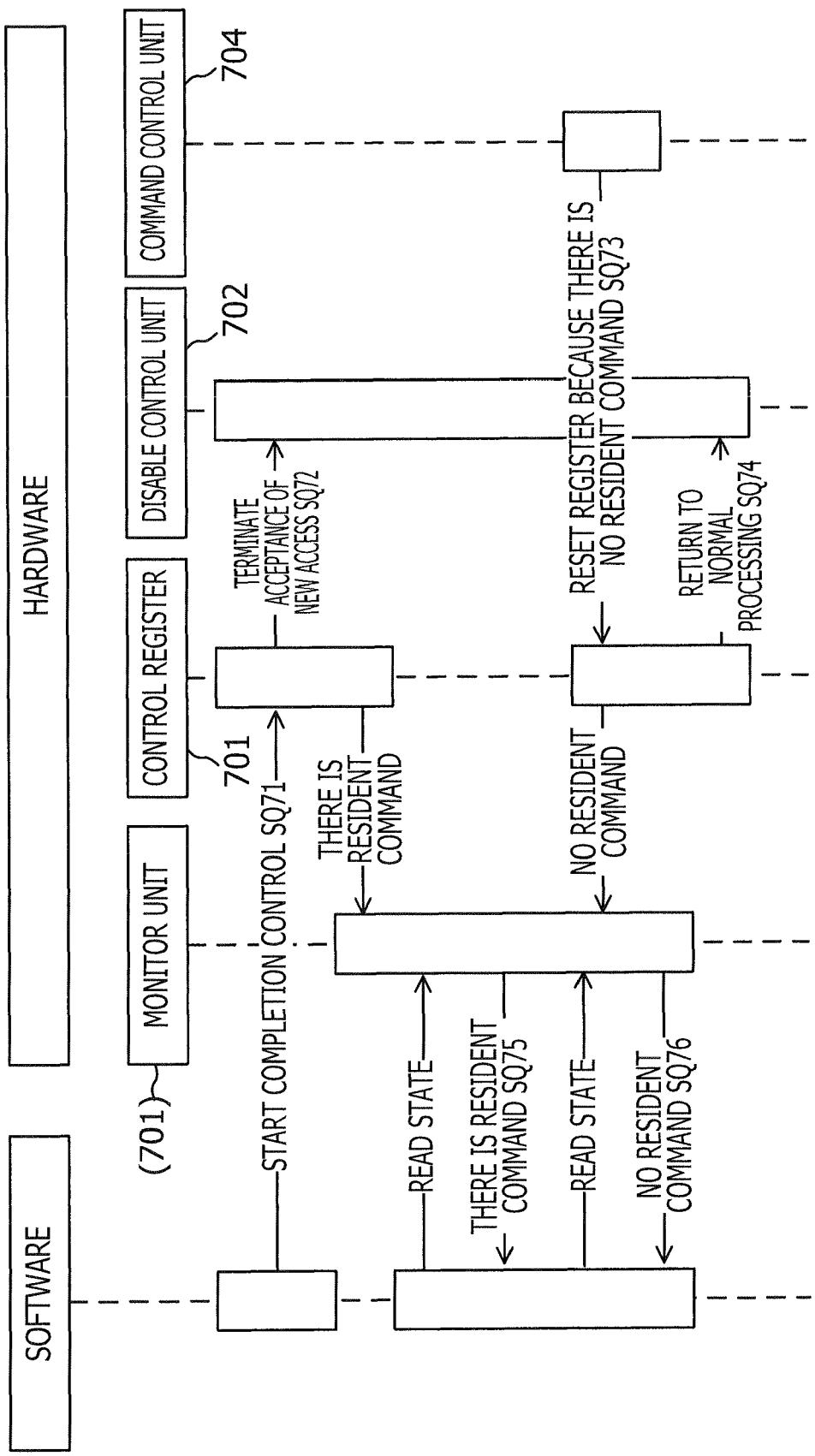
FIG. 21 is a sequence diagram for describing the bus control system of the seventh implementation in accordance with aspects of the present invention.

FIG. 20 is a block diagram illustrating an example of a store buffer circuit in a bus control system of the seventh implementation, and FIG. 21 is a sequence diagram for describing the bus control system of the seventh implementation.

That is, in the bus control system of the seventh implementation, instead of the bus bridge circuit 7a in the bus control system of the first implementation described above, a store buffer circuit 70 has a function similar to that of the bus bridge circuit 7a.

As illustrated in FIG. 20, the store buffer circuit 70 includes a control register 701, a disable control unit 702, a FIFO 703, a command control unit 704, and an AND gate 705.

The control register 701 is a register that validates an access request completion control function. The disable control unit 702 controls acceptance of a new access request for the store buffer circuit 70.

The FIFO 703 is a memory that holds an access request. The command control unit 704 monitors an access request.

Here, the control register 701 is, for example, an SR flip flop, and a control signal from a CPU or a bus is input to a set terminal S of the SR flip flop.

The AND gate 705 ANDs a Q output of the control register 701 and an output of the command control unit 704, and an output of the AND gate 705 is supplied to a reset terminal R of the control register 701.

A /Q output of the control register 701 is used as an output of a monitor terminal MT', which represents whether there is a resident command.

Referring to FIG. 21, in the bus control system of the seventh implementation, the software performs an activation setting of the control register 701 (SQ71). The disable control unit 702 terminates acceptance of a new access request for the store buffer circuit 70 when the Q output of the control register 701 becomes "1" (SQ72).

The command control unit 704 resets the control register 701 at a timing at which processing of all commands ends, that is, when there becomes no resident command (SQ73).

The disable control unit 702 returns to normal processing when the Q output of the control register 701 becomes "0" (SQ74). The software may check whether there is a resident command on the basis of the value of the monitor terminal MT' (SQ75 and SQ76).

In the seventh implementation, the bus bridge circuit 7a of the first implementation is replaced by the store buffer circuit 70 which has a similar function. In the second to sixth implementations, the bus bridge circuits 7b to 7f may be replaced by store buffer circuits that have similar functions.

Further, as has been described with reference to FIG. 3, the bus control systems of the implementations described above are widely applicable to various semiconductor ICs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the implementations in accordance with aspects of the present inventions have been described in detail, it should be understood that the various changes, substitutions, and alterations could be made hereto without departing from the spirit and scope of the invention.

What is claimed is:

1. A bus control system comprising:
a first bus to which a first circuit is connected;
a second bus to which a second circuit is connected;
a control circuit configured to transfer data between the first circuit and the second circuit, wherein the control circuit includes:
a control unit configured to be controlled by a control register and accept an access request for the control circuit; and
a command control unit configured to monitor the access accepted by the control unit,
wherein the control register is reset based on an output of the command control unit and an output of the control register.

2. The bus control system according to claim 1, wherein the control circuit is configured to monitor completion of processing of an access request that is resident in the control circuit.

3. The bus control system according to claim 2, further comprising:
a memory configured to hold the access request from the control unit,
wherein
an acceptance of a new access request is resumed automatically by resetting the control register.

4. The bus control system according to claim 3, wherein the control unit terminates acceptance of a new access request when an access request is resident in the control circuit.

5. The bus control system according to claim 3, wherein the control unit terminates acceptance of a new access request when a writing access request is resident in the control circuit.

6. The bus control system according to claim 2, wherein the control unit controls an addition of a flag to a new access request for the control circuit.

7. The bus control system according to claim 6, wherein the control unit sets a flag to an access request being accepted at the time the control register is set or to an access request that is accepted last among access requests that have already been accepted, and monitors completion of processing of the access request with the flag.

8. The bus control system according to claim 6, wherein the control unit sets flags to all access requests that are resident at the time the control register is set, and monitors completion of processing of the access requests with the flags.

9. The bus control system according to claim 6, wherein the control unit sets a flag to an access request being accepted at the time the control register is set or to a first access request that is newly accepted, and monitors completion of processing of the access request with the flag.

10. The bus control system according to claim 7, wherein an access request to which the flag is set is limited to a writing access request, and completion of processing of the access request with the flag is monitored.

11. The bus control system according to claim 8, wherein an access request to which the flag is set is limited to a writing access request, and completion of processing of the access request with the flag is monitored.

12. The bus control system according to claim 1, wherein the control circuit is a bus bridge circuit connected to the first bus and the second bus.

13. A semiconductor integrated circuit comprising:
a first bus to which a first circuit is connected;
a second bus to which a second circuit is connected; and
a control circuit configured to transfer data between the first circuit and the second circuit,
wherein the control circuit includes:
a control unit configured to be controlled by a control register and accept an access request for the control circuit; and
a command control unit configured to monitor the access accepted by the control unit, and
wherein the control register is reset based on an output of the command control unit and an output of the control register.

14. The semiconductor integrated circuit according to claim 13, wherein the control circuit monitors completion of processing of an access request that is resident in the control circuit.

15. The semiconductor integrated circuit according to claim 13, wherein the control circuit is a bus bridge circuit connected to the first bus and the second bus.

* * * * *